US009505268B2

(12) United States Patent
Sato

(10) Patent No.: US 9,505,268 B2
(45) Date of Patent: Nov. 29, 2016

(54) PNEUMATIC TIRE

(75) Inventor: Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/235,741

(22) PCT Filed: Jul. 29, 2011

(86) PCT No.: PCT/JP2011/067532
§ 371 (c)(1),
(2), (4) Date: Jan. 28, 2014

(87) PCT Pub. No.: WO2013/018178
PCT Pub. Date: Feb. 7, 2013

(65) Prior Publication Data
US 2014/0166178 A1 Jun. 19, 2014

(51) Int. Cl.
B60C 9/18 (2006.01)
B60C 9/22 (2006.01)
B60C 9/30 (2006.01)
B60C 9/20 (2006.01)
B29D 30/30 (2006.01)
B29D 30/16 (2006.01)

(52) U.S. Cl.
CPC ............ B60C 9/30 (2013.01); B60C 9/2006 (2013.04); B60C 9/2204 (2013.04); B29D 30/16 (2013.01); B29D 30/30 (2013.01); B60C 9/18 (2013.01); B60C 2009/2019 (2013.04); B60C 2009/2045 (2013.04); B60C 2009/2257 (2013.04); B60C 2009/2266 (2013.04); Y10T 152/10801 (2015.01)

(58) Field of Classification Search
CPC ............ B60C 9/18; B60C 9/20; B60C 9/22; B60C 9/2204; B60C 9/28
See application file for complete search history.

(56) References Cited

U.S. PATENT DOCUMENTS 4,815,514 A * 3/1989 Hara et al. .................... 152/531
5,386,866 A 2/1995 Suzuki et al.
2007/0113946 A1 5/2007 Manno et al.

FOREIGN PATENT DOCUMENTS

| DE | 10 2010 000 181 | | 7/2011 |
| GB | 815054 | * | 6/1959 |
| GB | 1601100 | * | 10/1981 |
| JP | H02-106409 | | 4/1990 |
| JP | 03287402 | * | 12/1991 |
| JP | H04-365604 | | 12/1992 |
| JP | H05-254309 | | 10/1993 |
| JP | 2007-137384 | | 6/2007 |
| JP | 2009-196600 | | 9/2009 |
| JP | 2004-9941 | * | 1/2014 |
| JP | 2003/146009 | * | 5/2014 |
| WO | WO 2009/076970 | * | 6/2009 |

OTHER PUBLICATIONS

International Search Report dated Oct. 18, 2011, 4 pages, Japan.

* cited by examiner

Primary Examiner — Justin Fischer
(74) Attorney, Agent, or Firm — Thorpe North & Western

(57) ABSTRACT

The pneumatic tire 1 includes the belt layer 14 having the pair of cross belts 142, 143, and a circumferential reinforcing layer 145 disposed between the cross belts 142, 143 or disposed inward in the tire radial direction of the cross belts 142, 143. Moreover, the circumferential reinforcing layer 145 is configured by one wire 1451 that is wound spirally at a slant within a range of ±5 deg with respect to the tire circumferential direction. Moreover, the crossing angle α in the tire circumferential direction of the wire end portion at the first edge and the wire end portion at the second edge of the circumferential reinforcing layer 145 is within a range of 5 deg≤α≤355 deg.

27 Claims, 19 Drawing Sheets

When the starting edge and the terminating edge of the wire are alternately disposed in the tire circumferential direction (2)

FIG. 19

PNEUMATIC TIRE

TECHNICAL FIELD

The present invention relates to a pneumatic tire, and more particularly relates to a pneumatic tire that can improve the tire durability.

BACKGROUND OF THE INVENTION

Conventional pneumatic tires have a reinforcing layer in a belt layer in order to improve the tire durability. The technology disclosed in Japanese Unexamined Patent Application Publication No. 2009-196600A is known as a conventional pneumatic tire that is configured in this manner.

SUMMARY

The present technology provides a pneumatic tire whereby tire durability can be improved. A pneumatic tire according to the present invention includes a belt layer having a pair of cross belts and a circumferential reinforcing layer disposed between the cross belts or inward in a tire radial direction from the cross belts. In such a pneumatic tire, the circumferential reinforcing layer is constituted from one wire that is wound spirally at a slant within a range of ±5 deg with respect to the tire circumferential direction, and a crossing angle α in the tire circumferential direction between an end portion of the wire at a first edge of the circumferential reinforcing layer and an end portion of the wire at second edge is within a range of 5 deg≤α≤355 deg.

Moreover, the pneumatic tire according to the present invention includes a belt layer having a pair of cross belts and a circumferential reinforcing layer disposed between the cross belts or inward in the tire radial direction from the cross belts. In such a pneumatic tire, the circumferential reinforcing layer is constituted from a plurality of wires that are wound spirally around side-by-side to each other at a slant within a range of ±5 deg with respect to the tire circumferential direction, and at least one of an offset angle β1 in the tire circumferential direction of end portions of the plurality of wires at a first edge of the circumferential reinforcing layer and an offset angle β2 in the tire circumferential direction of end portions of the plurality of wires at a second edge is within a range of not less than 0 deg and less than 5 deg, and a crossing angle α in the tire circumferential direction between an end portion of the wire at the first edge of the circumferential reinforcing layer and an end portion of the wire at the second edge is within a range of 10 deg≤α≤350 deg.

Moreover, the pneumatic tire according to the present invention includes a belt layer having a pair of cross belts and a circumferention reinforcing layer disposed between the cross belts or inward in the tire radial direction from the cross belts. In such a pneumatic tire, the circumferential reinforcing layer is constituted from a plurality of wires that are wound spirally around side-by-side to each other at a slant within a range of ±5 deg with respect to the tire circumferential direction, and an offset angle β1 in the tire circumferential direction of end portions of the plurality of wires at a first edge of the circumferential reinforcing layer and an offset angle β2 in the tire circumferential direction of end portions of the plurality of wires at a second edge are within a range of 5 deg≤β1≤180 deg and 5 deg≤β2≤180 deg, and a crossing angle α in the tire circumferential direction between an end portion of the wire at the first edge of the circumferential reinforcing layer and an end portion of the wire at the second edge is within a range of 5 deg≤α≤355 deg.

Moreover, the pneumatic tire according to the present invention includes a belt layer having a pair of cross belts and a circumferential reinforcing layer disposed between the cross belts or inward in the tire radial direction from the cross belts. In such a pneumatic tire, the circumferential reinforcing layer has a divided structure that is divided in a tire width direction into a plurality of portions and a divided portion of the circumferential reinforcing layer is constituted from one wire that is wound spirally at a slant within a range of ±5 deg with respect to the tire circumferential direction, and a crossing angle α in the tire circumferential direction between an end portion of the wire at a first edge of the circumferential reinforcing layer and an end portion of the wire at a second edge is within a range of 5 deg≤α≤355 deg, and a difference between a maximum value and a minimum value of the apparent number of wire cords when viewed as a cross-section from a direction perpendicular to the tire circumferential direction is one wire or less in any 30 deg zone around the tire rotational axis.

Moreover, the pneumatic tire according to the present invention includes a belt layer having a pair of cross belts and a circumferential reinforcing layer disposed between the cross belts or inward in the tire radial direction from the cross belts. In such a pneumatic tire, the circumferential reinforcing layer has a divided structure that is divided in the tire width direction into a plurality of portions and a divided portion of the circumferential reinforcing layer is constituted from a plurality of wires that are wound spirally around side-by-side to each other at a slant within a range of ±5 deg with respect to the tire circumferential direction, and at least one of an offset angle β1 in the tire circumferential direction of end portions of the plurality of wires at a first edge of the circumferential reinforcing layer and an offset angle β2 in the tire circumferential direction of end portions of the plurality of wires at a second edge is within a range of not less than 0 deg and less than 5 deg, and a crossing angle α in the tire circumferential direction between an end portion of the wire at the first edge of the circumferential reinforcing layer and an end portion of the wire at the second edge is within a range of 10 deg≤α≤350 deg, and the difference between a maximum value and a minimum value of the apparent number of wire cords when viewed as a cross-section from a direction perpendicular to the tire circumferential direction is equal to or less than the number of wire cords that configure one of the divided portions in any 30 deg zone around the tire rotational axis.

Moreover, the pneumatic tire according to the present invention includes a belt layer having a pair of cross belts and a circumferential reinforcing layer disposed between the cross belts or inward in the tire radial direction from the cross belts. In such a pneumatic tire, the circumferential reinforcing layer has a divided structure that is divided in the tire width direction into a plurality of portions and a divided portion of the circumferential reinforcing layer is constituted from a plurality of wires that are wound spirally around side-by-side to each other at a slant within a range of ±5 deg with respect to the tire circumferential direction, and an offset angle β1 in the tire circumferential direction of end portions of the plurality of wires at a first edge of the circumferential reinforcing layer and an offset angle β2 in the tire circumferential direction of end portions of the plurality of wires at a second edge are within a range of 5 deg≤β1≤180 deg and 5 deg≤β2≤180 deg, and a crossing angle α in the tire circumferential direction between an end portion of the wire at the first edge of the circumferential reinforcing layer and an end portion of the wire at the second edge is within a range of 5 deg≤α≤355 deg, and the difference between a maximum value and a minimum value of the apparent number of wire cords when viewed as a cross-section from a direction perpendicular to the tire circumferential direction is equal to or less than the number of wire cords that configure one of the divided portions in any 30 deg zone around the tire rotational axis.

Moreover, in the pneumatic tire according to the present invention, the circumferential reinforcing layer is preferably disposed inward in the tire width direction from the left and right edges of a narrower cross belt of the pair of cross belts, and a width W of the narrower cross belt and a distance S from an edge of the circumferential reinforcing layer to an edge of the narrower cross belt are preferably in ranges such that 0.03≤S/W.

Moreover, in the pneumatic tire according to the present invention, the wire is preferably steel wire, and the circumferential reinforcing layer preferably has no less than 17 ends/50 mm and no more than 30 ends/50 mm.

Moreover, in the pneumatic tire according to the present invention, the wire diameter is preferably within a range of no less than 1.2 mm and no more than 2.2 mm.

This pneumatic tire demonstrates suppressed local variation in stiffness in the tire circumferential direction since the crossing angle α between end portions of the wire in the circumferential reinforcing layer is made appropriate. As a result, the occurrence of separation between rubber materials near the circumferential reinforcing layer is suppressed and the tire durability is improved.

BRIEF DESCRIPTION OF THE DRAWINGS

Figure 19:
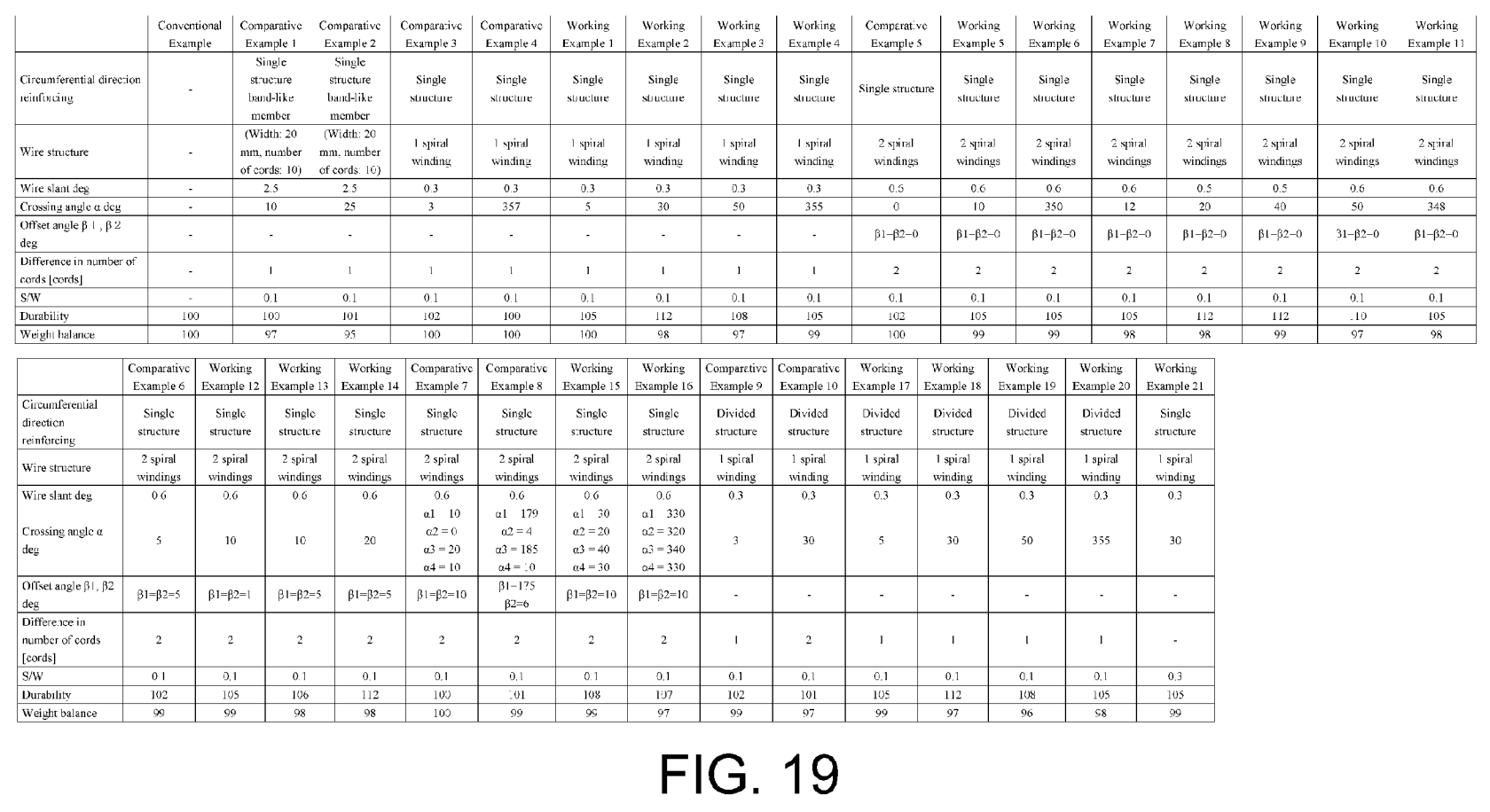

FIG. 19 includes a table showing the results of performance testing of pneumatic tires according to embodiment of the present invention.

DETAILED DESCRIPTION

The present invention is described below in detail with reference to the accompanying drawing. However, the present invention is not limited to these embodiments. Moreover, constituents of the embodiment which can possibly or obviously be substituted while maintaining consistency with the present invention are included. Furthermore, a plurality of modified examples that are described in the embodiment can be freely combined within a scope of obviousness for a person skilled in the art.

Pneumatic Tire

Figure 1:
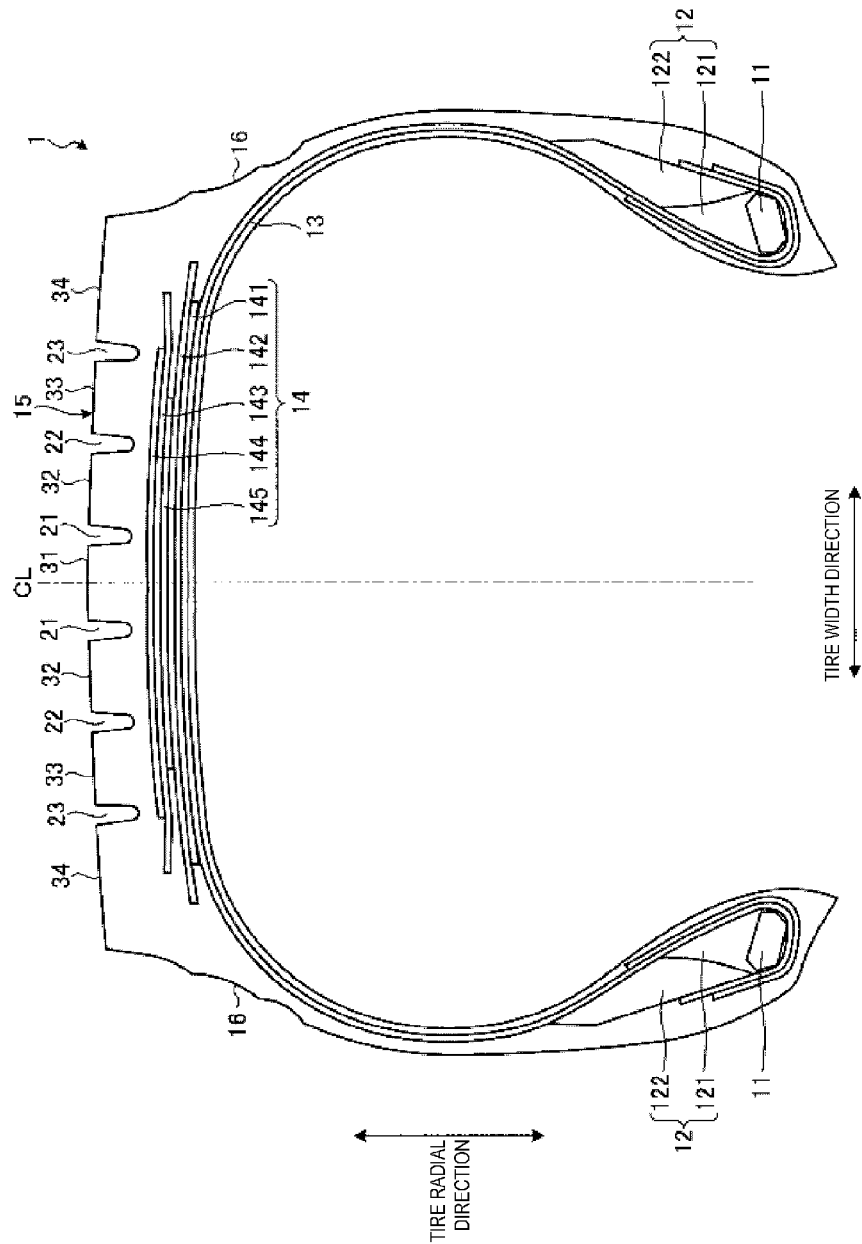
FIG. 1 is a cross-sectional view in a tire meridian direction illustrating a pneumatic tire according to an embodiment of the present invention.

FIG. 1 is a cross-sectional view in a tire meridian direction illustrating a pneumatic tire according to an embodiment of the present invention. As an example of a pneumatic tire, FIG. 1 illustrates a radial tire for heavy loads mounted on a steering axle of a truck, bus, and the like for long-distance transport.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in the tire radial direction so as to reinforce the bead portions. The carcass layer 13 has a single-layer structure, and stretches between the left and right bead cores 11 and 11 in toroidal form, forming a framework for the tire. Additionally, both end portions of the carcass layer 13 are folded toward an outer side in the tire width direction and fixed so as to wrap around the bead cores 11 and the bead fillers 12. The belt layer 14 is formed from a plurality of belt plies 141 to 145 that are laminated, and is disposed on the periphery of the carcass layer 13 in the tire radial direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right sidewall portions of the tire. Additionally, the pneumatic tire 1 includes a plurality of circumferential main grooves 21 to 23 extending in a tire circumferential direction, and a plurality of land portions 31 to 34 partitioned by the circumferential main grooves 21 to 23 in the tread. In this embodiment, the pneumatic tire 1 has a left-right symmetric construction centered on a tire equatorial plane CL.

Figure 2:
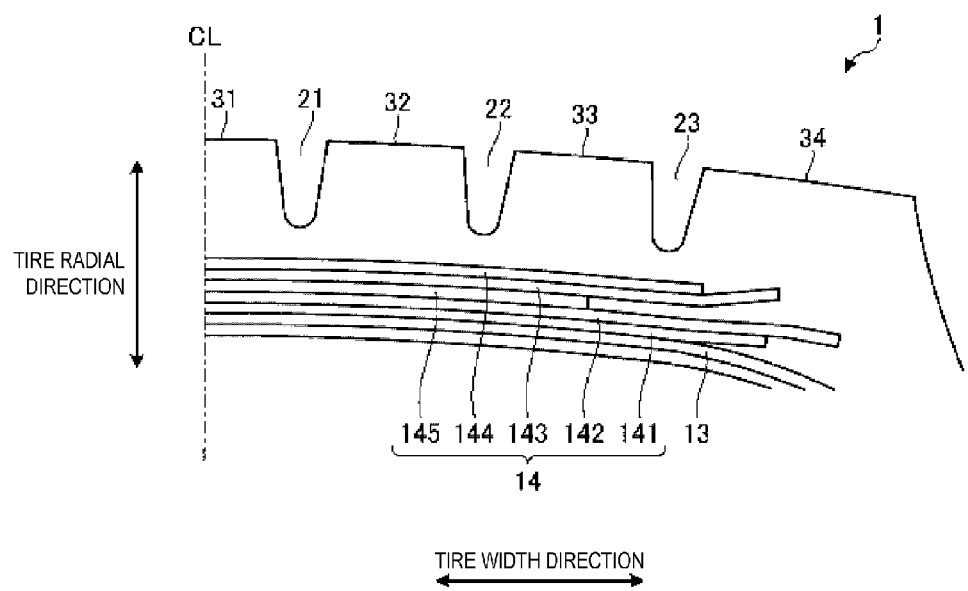
FIG. 2 is an explanatory view illustrating a belt layer of the pneumatic tire 1 depicted in FIG. 1.
Figure 3:
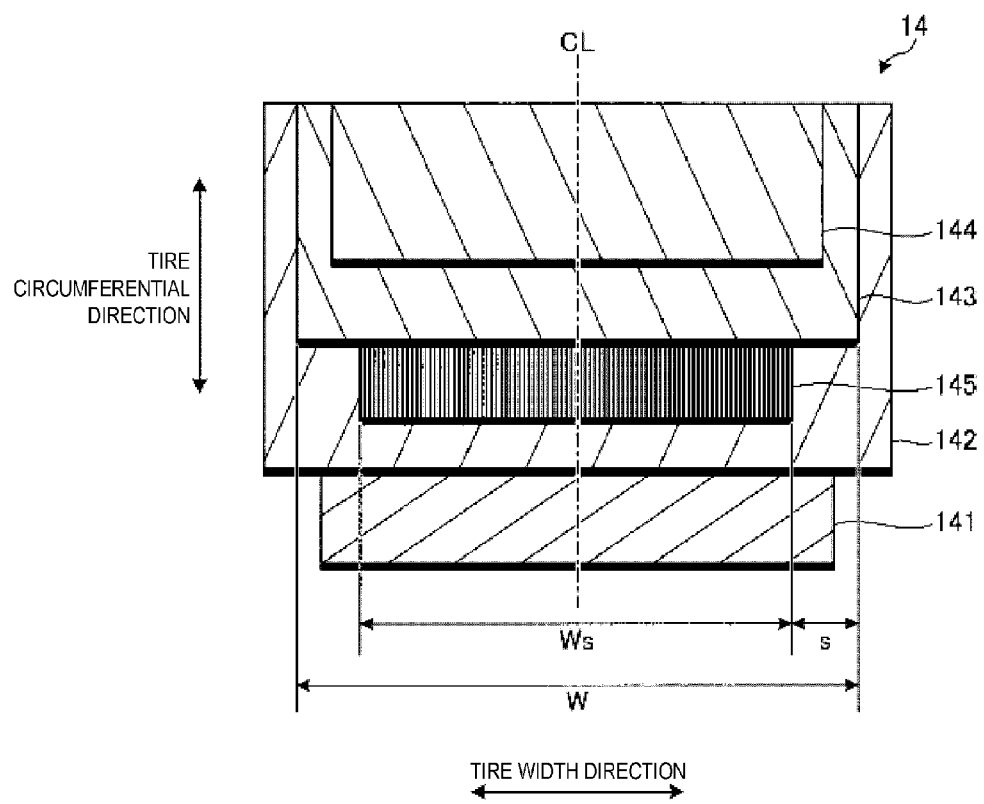
FIG. 3 is an explanatory view illustrating the belt layer of the pneumatic tire 1 depicted in FIG. 1.

FIGS. 2 and 3 are explanatory views illustrating a belt layer of the pneumatic tire 1 depicted in FIG. 1. Among these drawings, FIG. 2 illustrates a region on one side of the tread portion demarcated by the tire equatorial plane CL, and FIG. 3 illustrates a laminated structure of the belt layer.

The belt layer 14 is formed by laminating a large angle belt 141, a pair of cross belts 142, 143, a belt cover 144, and a circumferential reinforcing layer 145, disposed on the periphery of the carcass layer 13 (see FIGS. 2 and 3).

The large angle belt 141 is configured by a plurality of belt cords formed from steel or organic fibers, covered by coating rubber, and subjected to a rolling process, having a belt angle (angle of inclination of belt cord fiber direction with respect to the tire circumferential direction), as an absolute value, of no less than 40 deg and no more than 60 deg. Moreover, the large angle belt 141 is disposed so as to be laminated outward in the tire radial direction of the carcass layer 13.

The pair of cross belts 142, 143 are configured by a plurality of belt cords formed from steel or organic fibers, covered by coating rubber, and subjected to a rolling process, having a belt angle, as an absolute value, of no less than 10 deg and no more than 30 deg. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated on the drawings). Moreover, the pair of cross belts 142, 143 are disposed so as to be laminated outward in the tire radial direction of the large angle belt 141.

The belt cover 144 is configured by a plurality of belt cords formed from steel or organic fibers, covered by coating rubber, and subjected to a rolling process, having a belt angle, as an absolute value, of no less than 10 deg and no more than 45 deg. Moreover, the belt cover 144 is disposed so as to be laminated outward in the tire radial direction of the cross belts 142, 143. In this embodiment, the belt cover 144 has the same belt angle as the outer-side cross belt 143, and is disposed in the outermost layer of the belt layer 14.

The circumferential reinforcing layer 145 is constituted from rubber coated steel wires, and has a configuration in which at least one wire is wound spirally at a slant within a range of ±5 deg with respect to the tire circumferential direction. Additionally, the circumferential reinforcing layer 145 is disposed so as to be interposed between the pair of cross belts 142, 143. Additionally, the circumferential reinforcing layer 145 is disposed inward in the tire width direction of left and right edges of the pair of cross belts 142, 143. Specifically, a wire is wound spirally around the periphery of the inner-side cross belt 142 to form the circumferential reinforcing layer 145. This circumferential reinforcing layer 145 reinforces the stiffness in the tire circumferential direction. As a result, the tire durability is improved.

The belt layer 14 may have an edge cover (not illustrated on the drawings). Generally, the edge cover is configured by a plurality of belt cords formed from steel or organic fibers, covered by coating rubber, and subjected to a rolling process, having a belt angle of within a range of ±5 deg. Additionally, edge covers are disposed outward in the tire radial direction of the left and right edges of the outer-side cross belt 143 (or the inner-side cross belt 142). As a result of the band effect of the edge cover, the difference in radial growth of a tread center region and a shoulder region is reduced, and uneven wear resistance performance of the tire is improved.

Circumferential Reinforcing Layer

Figure 4:
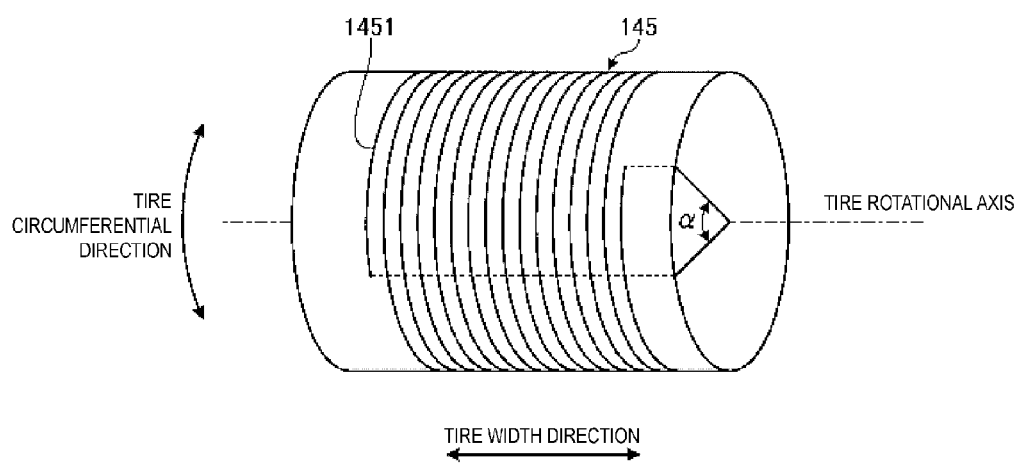
FIG. 4 is an explanatory view illustrating a circumferential reinforcing layer of the pneumatic tire 1 depicted in FIG. 1.

FIG. 4 is an explanatory view illustrating a circumferential reinforcing layer of the pneumatic tire 1 depicted in FIG. 1. FIG. 4 schematically illustrates a winding structure of the wire that configures the circumferential reinforcing layer.

As described above, the circumferential reinforcing layer 145 is constituted from at least one wire that is wound spirally at a slant within a range of ±5 deg with respect to the tire circumferential direction.

For example, in this embodiment, the belt layer 14 includes a single circumferential reinforcing layer 145 between the cross belts 142, 143 (see FIGS. 2 and 3). Additionally, the circumferential reinforcing layer 145 extends in the tire width direction, centered on the tire equatorial plane CL to cross substantially the entire region of the tread center region. Additionally, both edges of the circumferential reinforcing layer 145 are positioned inward in the tire width direction of both of the edges of the cross belts 142, 143. Moreover, the circumferential reinforcing layer 145 is configured by a single wire 1451 that is wound spirally around the periphery of the inner-side cross belt 142 (see FIG. 4).

In this embodiment, the circumferential reinforcing layer 145 is disposed so as to be interposed between the pair of cross belts 142, 143 (see FIG. 2). However, the configuration is not limited thereto, and the circumferential reinforcing layer 145 may be disposed on an inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated on the drawings).

Crossing Angle α Between Wire End Portions

Figure 5:
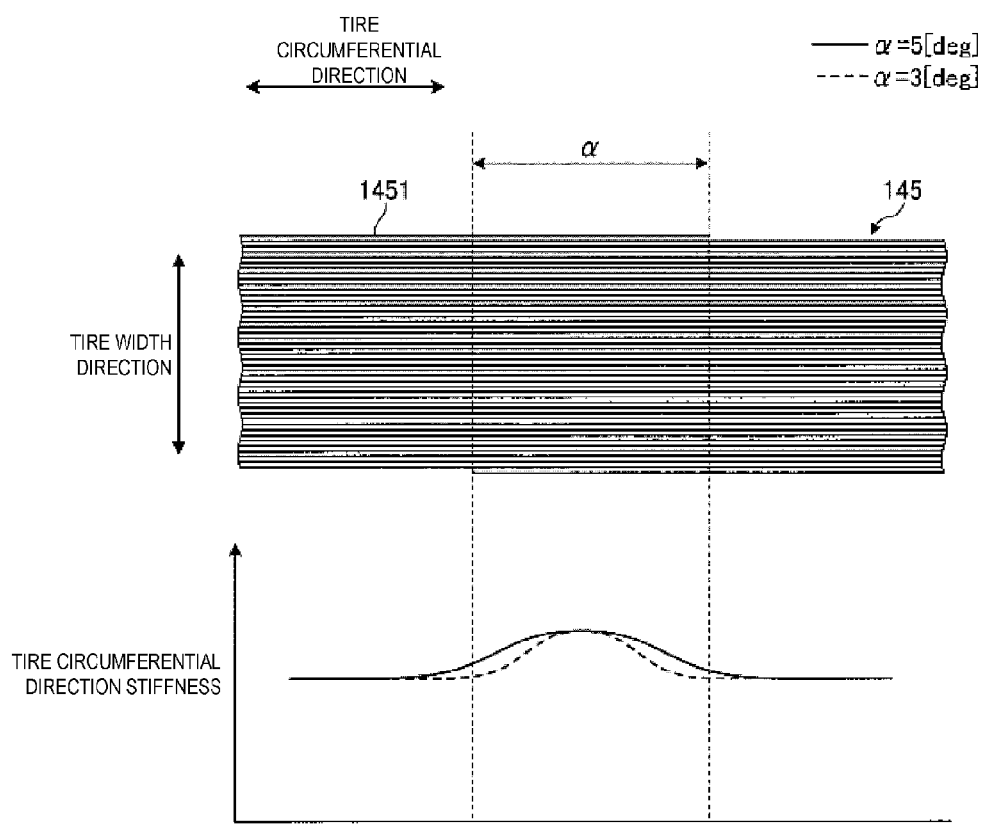
FIG. 5 is an explanatory view illustrating the circumferential reinforcing layer of the pneumatic tire 1 depicted in FIG. 1.
Figure 6:
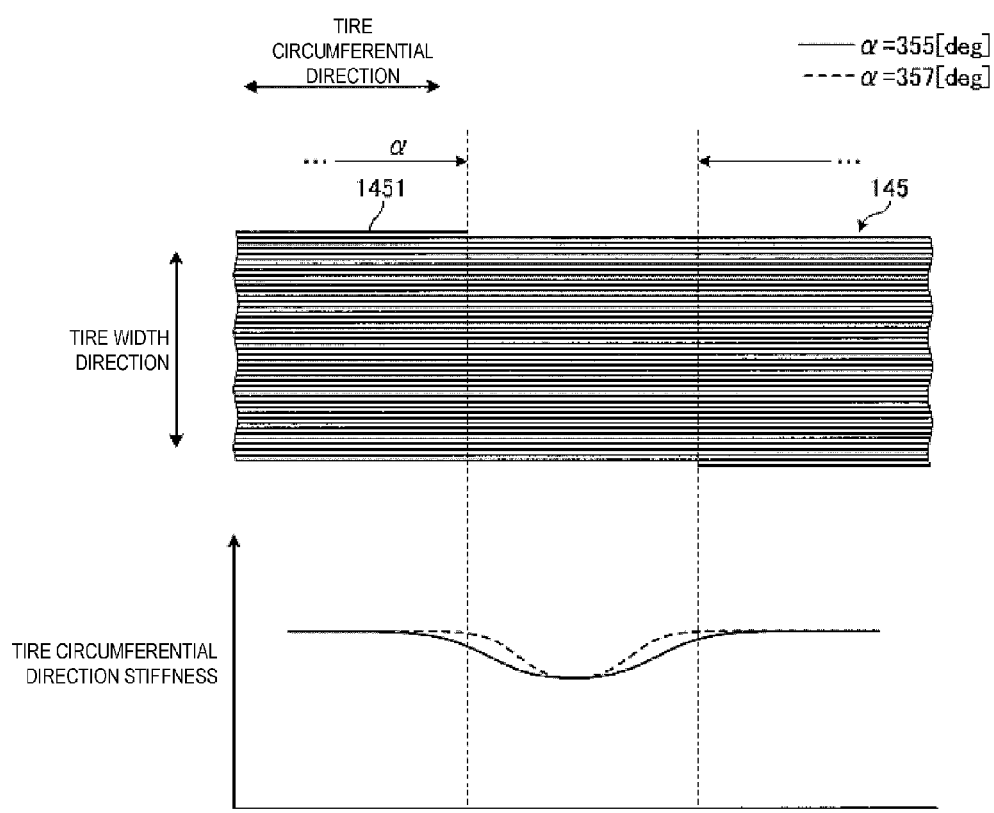
FIG. 6 is an explanatory view illustrating a modified example of the circumferential reinforcing layer depicted in FIG. 5.

FIG. 5 is an explanatory view illustrating a circumferential reinforcing layer of the pneumatic tire depicted in FIG. 1. FIG. 6 is an explanatory view illustrating a modified example of the circumferential reinforcing layer depicted in FIG. 5. The drawings illustrate a relationship between the wire winding structure and stiffness in the tire circumferential direction.

Next, a crossing angle α in the tire circumferential direction between an end portion of a wire at a first edge of the circumferential reinforcing layer and an end portion of a wire at a second edge will be defined (see FIG. 4). The crossing angle α is an angle around the tire rotational axis and indicates the range of a region in which the end portion of the wire at the first edge and the end portion of the wire at the second edge cross (overlap) in the tire circumferential direction. The range of the crossing angle α is 0 deg≤α<360 deg. The same definition of the crossing angle α applies when one circumferential reinforcing layer 145 is configured by a plurality of wires. Such a case is described below.

For example, in this embodiment, the belt layer 14 includes a single circumferential reinforcing layer 145 between the cross belts 142, 143, and the circumferential reinforcing layer 145 is configured by the single wire 1451 that is wound spirally around the periphery of the inner-side cross belt 142 (see FIGS. 3 and 4). As a result, the crossing angle α is regulated by the positional relationship of the starting edge and the terminating edge of the wire 1451 in the tire circumferential direction.

According to research by the inventors, the stiffness in the tire circumferential direction changes according to the starting point of the wire end portions on the left and right edges of the circumferential reinforcing layer 145 (see FIGS. 5 and 6). For example, as illustrated in FIG. 5, when the crossing angle α approaches 0 deg (the positions of the end portions of the wire 1451 approach each other), the stiffness in the tire circumferential direction increases locally near the end portions of the wire 1451. Moreover, as illustrated in FIG. 6, when the crossing angle α approaches 360 deg, the stiffness in the tire circumferential direction decreases locally near the end portions of the wire 1451.

Consequently, the crossing angle α in the tire circumferential direction between the end portion of the wire 1451 at the first edge and the end portion of the wire 1451 at the second edge of the circumferential reinforcing layer 145 of the pneumatic tire 1 is in a range of 5 deg≤α≤355 deg.

In such a configuration, local variation in stiffness in the tire circumferential direction is suppressed since the crossing angle α between the end portions of the wire 1451 of the circumferential reinforcing layer 145 are made appropriate (see FIGS. 5 and 6). As a result, the occurrence of separation between rubber materials near the circumferential reinforcing layer is suppressed and the tire durability is improved. For example, as illustrated in FIG. 5, when comparing the configuration in which the crossing angle α is α=5 deg and a configuration in which the crossing angle α is α=3 deg, it can be seen that the rate of variation in the stiffness in the tire circumferential direction noticeably decreases (the slopes in the graphs become smoother). Similarly, as illustrated in FIG. 6, when comparing the configuration in which the crossing angle α is α=355 deg and a configuration in which the crossing angle α is α=357 deg, it can be seen that the rate of variation in the stiffness in the tire circumferential direction noticeably decreases.

The crossing angle α in the pneumatic tire 1 is more preferably within a range of 20 deg≤α≤40 deg. That is, the end portion of the wire 1451 at the first edge and the end portion of the wire 1451 at the second edge of the circumferential reinforcing layer 145 are preferably disposed so as to appropriately cross each other. As a result, variation in the stiffness in the tire circumferential direction is effectively alleviated.

The crossing angle α is more preferably within a range of 5 deg≤α≤30 deg and 330 deg≤α≤355 deg in the pneumatic tire 1. By excluding positions that are 30 deg<α<330 deg in this way, the weight balance of the tire is made uniform and the tire uniformity is improved.

Multiple Winding Structure of Circumferential Reinforcing Layer

FIGS. 7 to 13 are explanatory views illustrating modified examples of the circumferential reinforcing layer depicted in FIG. 5. The drawings illustrate a circumferential reinforcing layer having a multi-winding structure. Explanations of items similar to those of the circumferential reinforcing layer in FIG. 5 will be omitted in the modified examples.

The circumferential reinforcing layer 145 is constituted from a single wire 1451 that is wound spirally in the configuration of FIG. 5 (see FIGS. 3 and 4). As a result, the crossing angle α is regulated by the positional relationship of the starting edge and the terminating edge of the single wire 1451 in the tire circumferential direction.

However, the configuration is not limited thereto, and the circumferential reinforcing layer 145 may be constituted from a plurality of wires that are wound spirally around side-by-side to each other (see FIGS. 7 to 13). That is, the circumferential reinforcing layer 145 may have a multiple winding structure. The crossing angle α is defined in the same way in this configuration.

Figure 7:
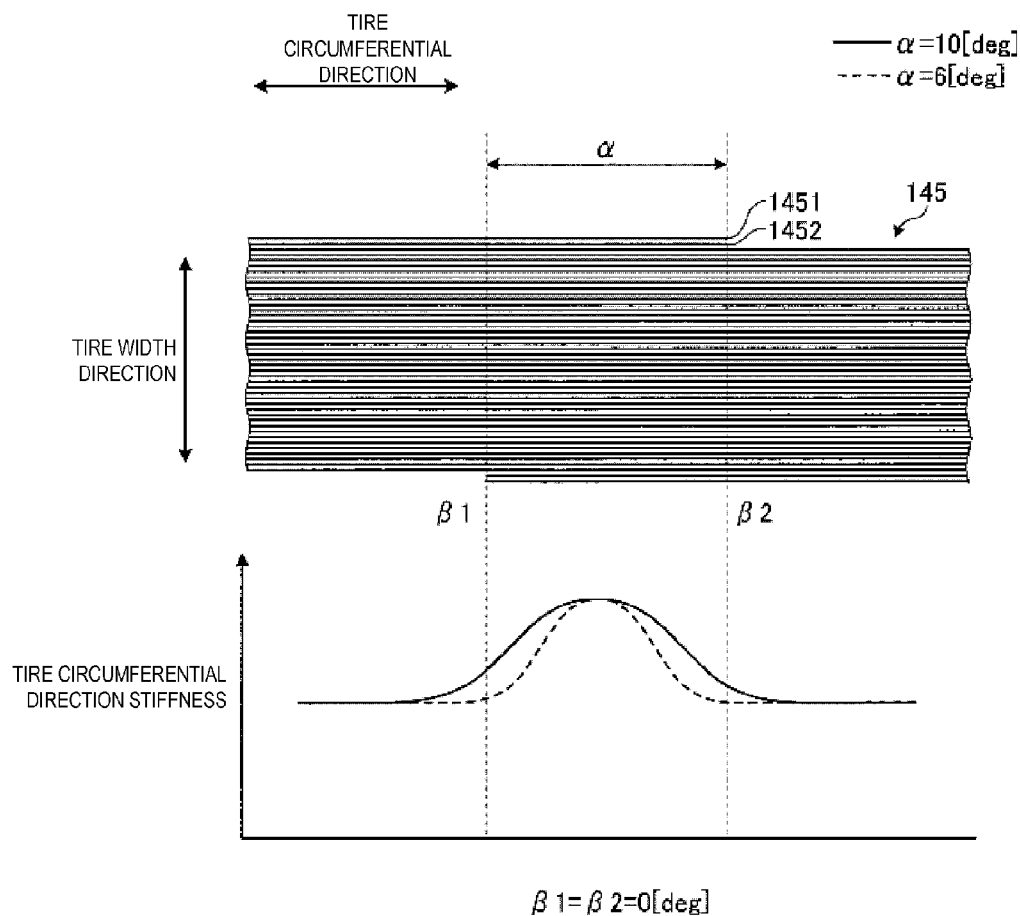
FIG. 7 is an explanatory view illustrating a modified example of the circumferential reinforcing layer depicted in FIG. 5.
Figure 8:
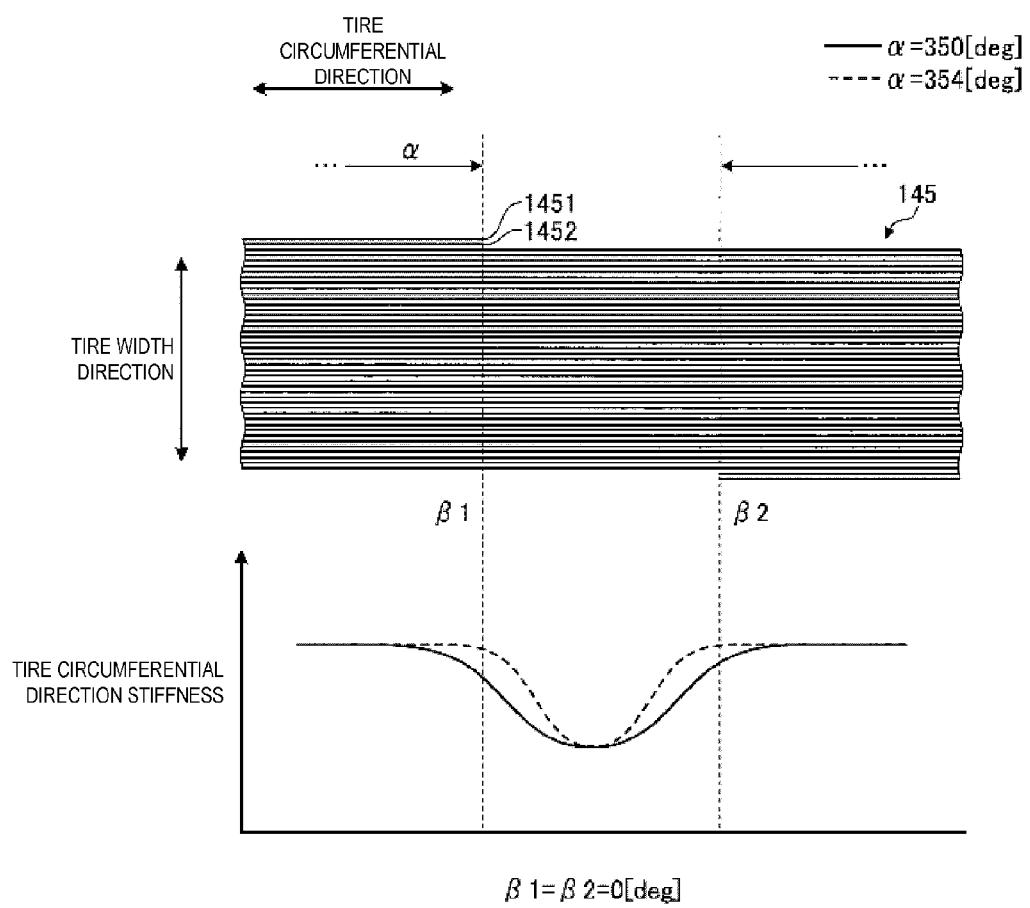
FIG. 8 is an explanatory view illustrating a modified example of the circumferential reinforcing layer depicted in FIG. 5.

For example, in the modified examples in FIGS. 7 and 8, the circumferential reinforcing layer 145 is constituted from two wires 1451, 1452 that are wound spirally around side-by-side to each other. As a result, starting edges of the two wires 1451, 1452 are each disposed at a first edge of the circumferential reinforcing layer 145, and two terminating edges of the two wires 1451, 1452 are each disposed at a second edge of the circumferential reinforcing layer 145. The starting edges of the wires 1451, 1452 are disposed aligned with each other at a position in the tire circumferential direction, and the terminating edges thereof are disposed aligned with each other at a position in the tire circumferential direction.

Figure 9:
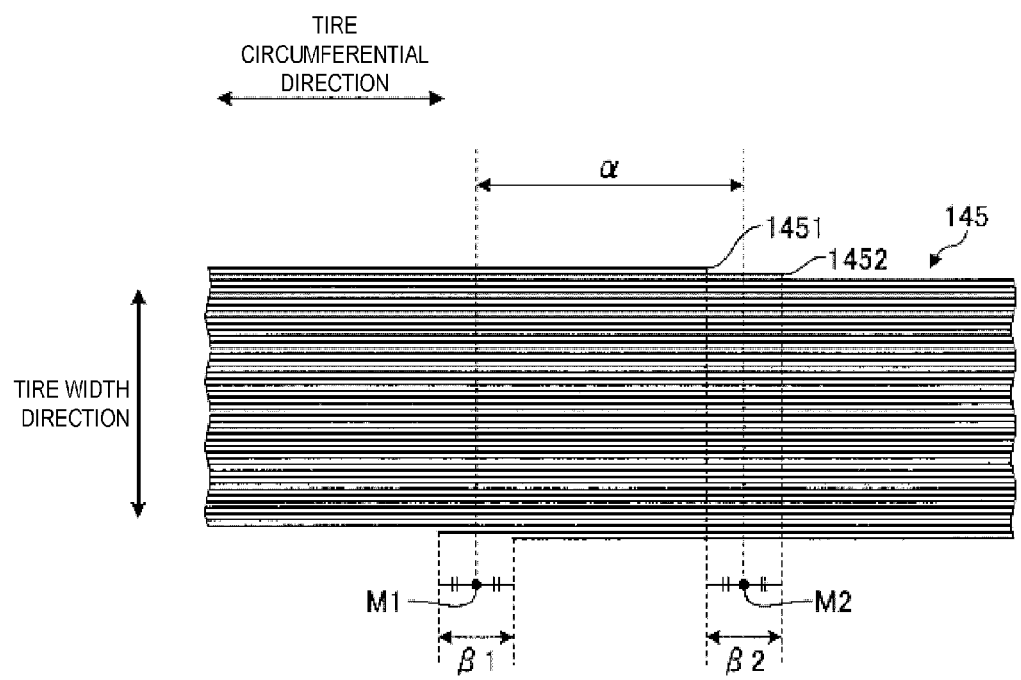
FIG. 9 is an explanatory view illustrating a modified example of the circumferential reinforcing layer depicted in FIG. 5.
Figure 10:
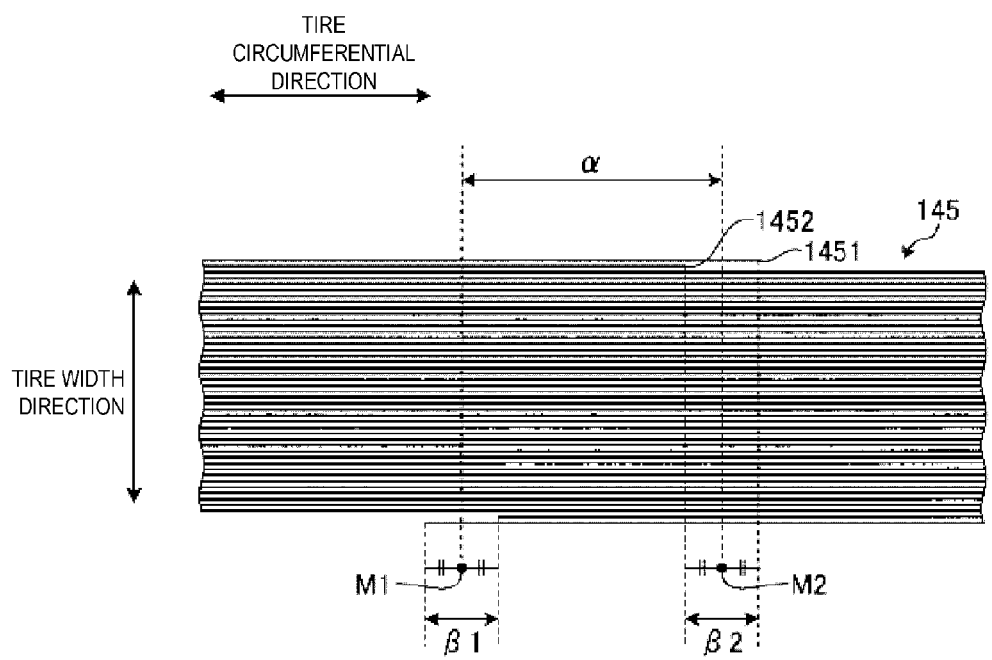
FIG. 10 is an explanatory view illustrating a modified example of the circumferential reinforcing layer depicted in FIG. 5.

Additionally, in the modified examples in FIGS. 9 to 12, the starting edges of the two wires 1451, 1452 are disposed at positions in the tire circumferential direction that are offset from each other, and the terminating edges thereof are disposed at positions offset from each other in the tire circumferential direction from the modified examples in FIGS. 7 and 8. In such a configuration, there is a preferable feature that variation in the stiffness in the tire circumferential direction is effectively alleviated in comparison to the modified examples in FIGS. 7 and 8. As illustrated in FIG. 9, the wire inward in the width direction of the circumferential reinforcing layer 145 may be longer at the left and right edges of the circumferential reinforcing layer 145, and, as illustrated in FIG. 10, the wire outward in the width direction of the circumferential reinforcing layer 145 may be longer.

Here, offset angles in the tire circumferential direction of the end portions of the wires 1451, 1452 at the left and right edges of the circumferential reinforcing layer 145 are defined by using offset angle β1 deg and offset angle β2 deg around the tire rotational axis. The ranges of these offset angles β1 and β2 are 0 deg≤β1≤180 deg and 0 deg≤β2≤180 deg.

The crossing angle α is defined as described below with respect to these offset angles β1, β2.

First, since the end portions of the wires 1451, 1452 are disposed aligned with each other at the left and right edges of the circumferential reinforcing layer 145 in the modified examples of FIGS. 7 and 8, the offset angles β1, β2 thereof satisfy β1=β2=0 deg. In such a configuration, the crossing angle α is defined on the basis of the positional relationships of the starting edges and the terminating edges of the two wires 1451, 1452.

Moreover, in the modified examples of FIGS. 9 and 10, the offset angles β1 and β2 are within a range of 0 deg<β1<5 deg and 0 deg<β2<5 deg, and the end portions of the two wires 1451, 1452 are in a state of being substantially disposed aligned with each other. Consequently, in such a case, a midpoint M1 between the starting edges and a midpoint M2 between the terminating edges of the two wires 1451, 1452 are established, and the end portion positions of the two wires 1451, 1452 approach each other from these midpoints M1, M2. The crossing angle α is then defined on the basis of the positional relationships of the midpoints M1, M2.

Figure 11:
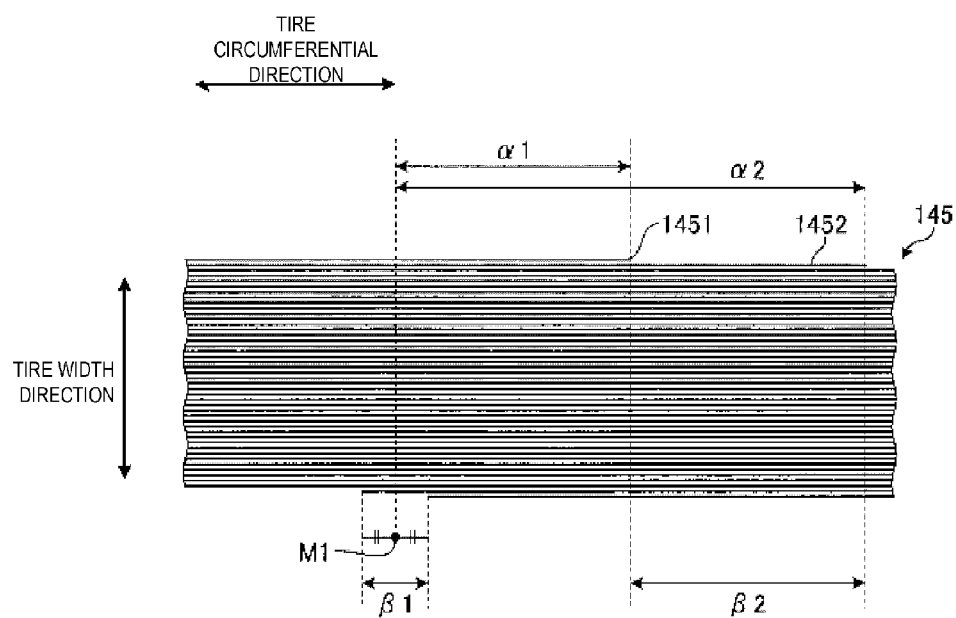
FIG. 11 is an explanatory view illustrating a modified example of the circumferential reinforcing layer depicted in FIG. 5.

Moreover, in the modified example of FIG. 11, the offset angles β1 and β2 are within a range of 0 deg<β1<5 deg and 5 deg≤β2≤180 deg. In such a case, in the same way as in the modified examples of FIGS. 9 and 10, the end portion positions of the two wires 1451, 1452 using the midpoint M1 approach each other at the offset angle β1. Crossing angles α1, α2 are each defined for the combinations of this midpoint M1 and the end portions of the two wires 1451, 1452 at the second edge.

Figure 12:
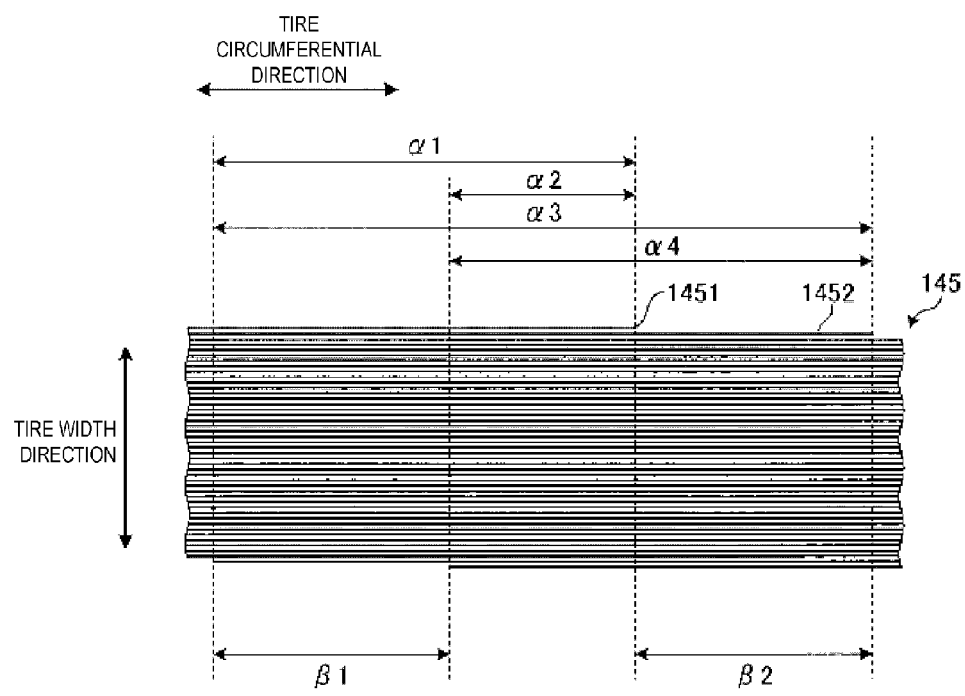
FIG. 12 is an explanatory view illustrating a modified example of the circumferential reinforcing layer depicted in FIG. 5.

Moreover, in the modified example of FIG. 12, the offset angles β1 and β2 are within a range of 5 deg≤β1≤180 deg and 5 deg≤β2≤180 deg. As such, crossing angles α1 to α4 are each defined for the combinations of the end portions of the two wires 1451, 1452 at the first edge and the end portions of the two wires 1451, 1452 at the second edge of the circumferential reinforcing layer 145. Here, four crossing angles α1 to α4 occur due to the circumferential reinforcing layer 145 being configured by the two wires 1451, 1452.

In the modified examples of FIGS. 7 to 11, the crossing angle α (α1, α2) is set within a range of 10 deg≤α≤350 deg. In comparison to the circumferential reinforcing layer 145 configured with one wire 1451 (see FIGS. 5 and 6), the range of α is narrower. This is because the stiffness variation ratio in the tire circumferential direction (see FIGS. 7 and 8) is large, since the circumferential reinforcing layer 145 is configured by a plurality of wires 1451, 1452.

Moreover, in the modified example of FIG. 12, the crossing angle α (α1 to α4) is set to be within a range of 5 deg≤α≤355 deg. As illustrated in the modified example of FIGS. 11 and 12, when a plurality of crossing angles α1 to α4 occur, all of the crossing angles α1 to α4 are required to be within the above range.

In such a configuration, local variation in stiffness in the tire circumferential direction is suppressed since the crossing angles α (α1 to α4) of the end portions of the wires 1451, 1452 in the circumferential reinforcing layer 145 are made appropriate (see FIGS. 7 and 8). As a result, the occurrence of separation between rubber materials near the circumferential reinforcing layer is suppressed and tire durability is improved.

In the modified examples of FIGS. 7 to 12, the crossing angles α (α1 to α4) is more preferably within a range of 15 deg≤α≤30 deg. That is, the end portions of the wires 1451, 1452 at the first edge and the end portions of the wires 1451, 1452 at the second edge of the circumferential reinforcing layer 145 are preferably disposed to appropriately cross each other. As a result, local variation in stiffness in the tire circumferential direction is effectively alleviated.

Moreover, in the modified examples in FIGS. 7 to 12, the crossing angle α is more preferably within a range of 10 deg≤α≤30 deg and 330 deg≤α≤350 deg. By excluding positions that are 30 deg<α<330 deg in this way, the weight balance of the tire is made uniform and the tire uniformity is improved.

Additionally, in the modified examples in FIGS. 7 to 12, the circumferential reinforcing layer 145 is configured by two wires 1451, 1452. However, the configuration is not limited thereto, and the circumferential reinforcing layer 145 may be configured by three or more wires (see FIG. 13).

Figure 13:
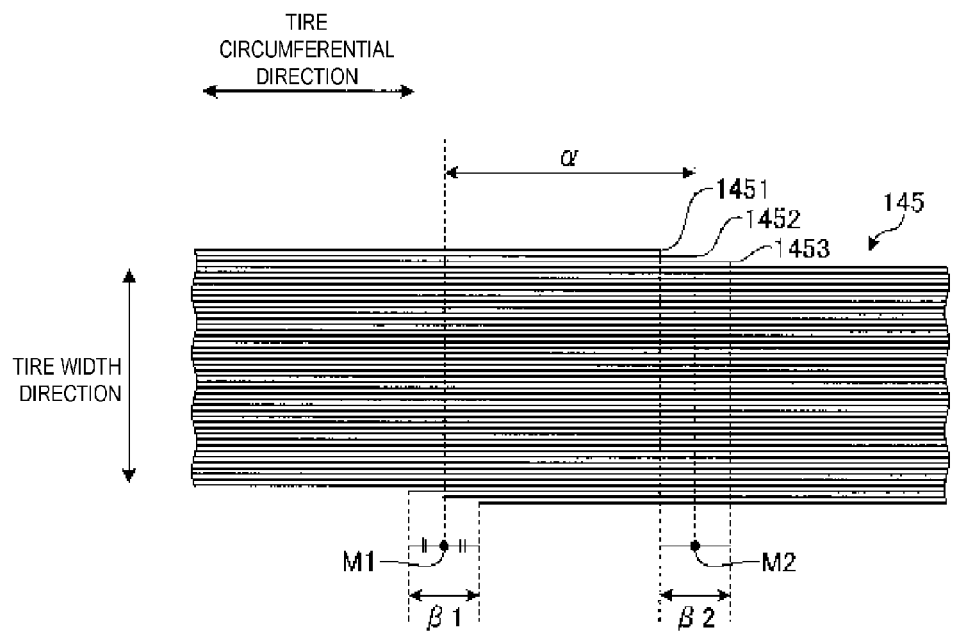
FIG. 13 is an explanatory view illustrating a modified example of the circumferential reinforcing layer depicted in FIG. 5.

For example, the modified example in FIG. 13 illustrates a configuration in which the circumferential reinforcing layer 145 is configured by three wires 1451 to 1453. As illustrated in FIG. 13, in the configuration in which the circumferential reinforcing layer 145 is configured by three or more wires, the maximum values β1, β2 (angles between the end portions that are furthest apart) of the offset angles of the end portions of the wires 1451 to 1453 at the edges of the circumferential reinforcing layer 145 are used to define the crossing angle α. Specifically, when at least one of the maximum offset angle values β1, β2 is within a range of 0 deg or more and less than 5 deg (see FIG. 13), the crossing angle α is set to be within the range of 10 deg≤α≤350 deg in the same way as in the cases of the modified examples in FIGS. 7 to 11. Moreover, when the maximum offset angle values β1 and β2 are within a range of 5 deg≤β1≤180 deg and 5 deg≤β2≤180 deg (not illustrated on the drawings), the crossing angle α is set to be within the range of 5 deg≤α≤355 deg in the same way as in the case in the modified example in FIG. 2.

As illustrated in the modified examples in FIGS. 7 to 13, the number of wires is preferably five wires or less in the configuration in which the circumferential reinforcing layer 145 is configured by a plurality of wires that are wound spirally around side-by-side to each other (multiple winding structure). Additionally, the width of winding per unit when five wires are wound in multiple layers is preferably no more than 12 mm. As a result, a plurality of wires (no less than 2 and no more than 5 wires) can be wound properly at a slant within a range of ±5 deg with respect to the tire circumferential direction.

Divided Structure of Circumferential Reinforcing Layer

FIGS. 14 to 18 illustrate modified examples of the circumferential reinforcing layer depicted in FIG. 5. The drawings illustrate a circumferential reinforcing layer having a divided structure. Explanations of items similar to those of the circumferential reinforcing layer in FIG. 5 will be omitted in the modified examples.

In the configuration of FIG. 5, the circumferential reinforcing layer 145 has a single structure in which the circumferential reinforcing layer 145 is configured by a single wire 1451 that is wound spirally (see FIGS. 3 and 4). As a result, the starting and terminating edges of the wire 1451 are positioned at the left and right edges of the circumferential reinforcing layer 145. The crossing angle α is regulated by the positional relationship of the starting edge and the terminating edge of the single wire 1451 in the tire circumferential direction.

However, the configuration is not limited thereto, and the circumferential reinforcing layer 145 may have a divided structure in which the circumferential reinforcing layer 145 is divided into a plurality of portions in the tire width direction. In other words, the circumferential reinforcing layer 145 may have a wire end portion in a center portion in the tire width direction. As a result, tire productivity is improved since the circumferential reinforcing layer can be formed by applying a plurality of wires.

Figure 14:
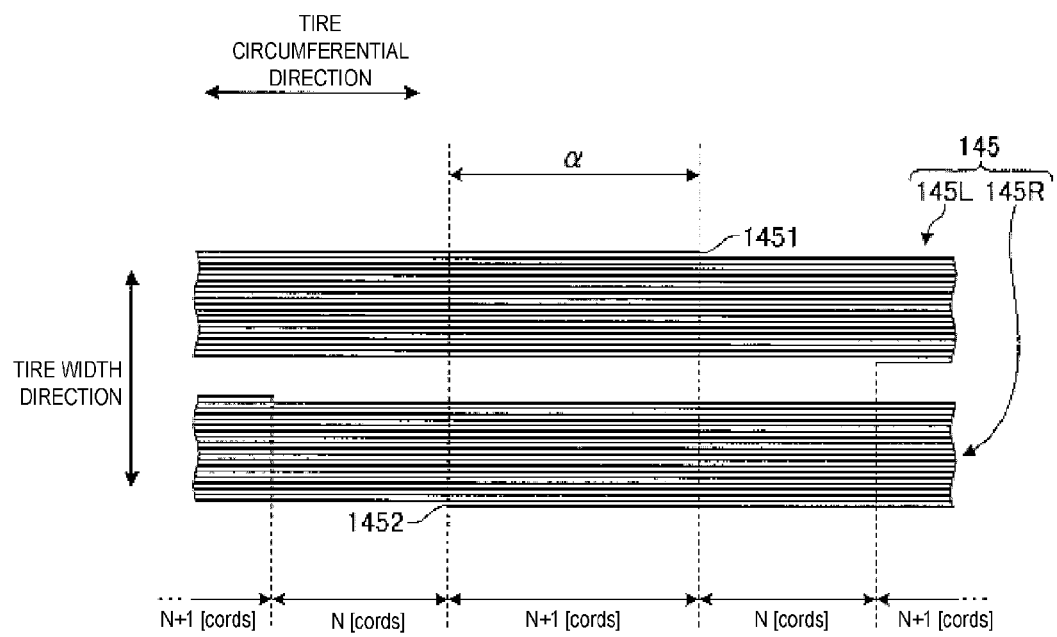
FIG. 14 is an explanatory view illustrating a modified example of the circumferential reinforcing layer depicted in FIG. 5.
Figure 15:
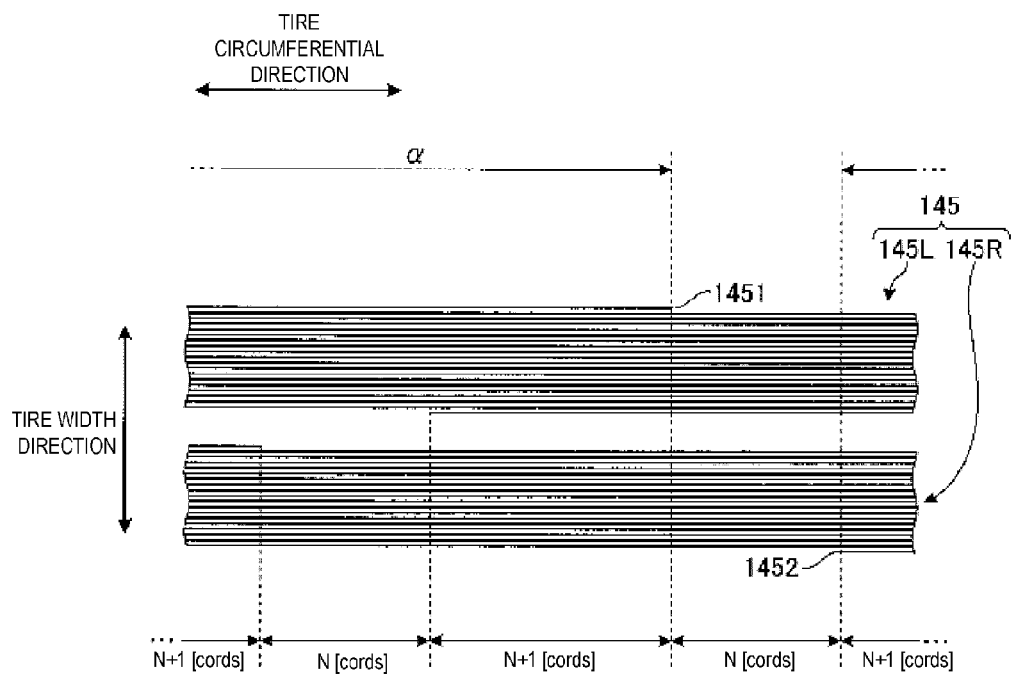
FIG. 15 is an explanatory view illustrating a modified example of the circumferential reinforcing layer depicted in FIG. 5.
Figure 16:
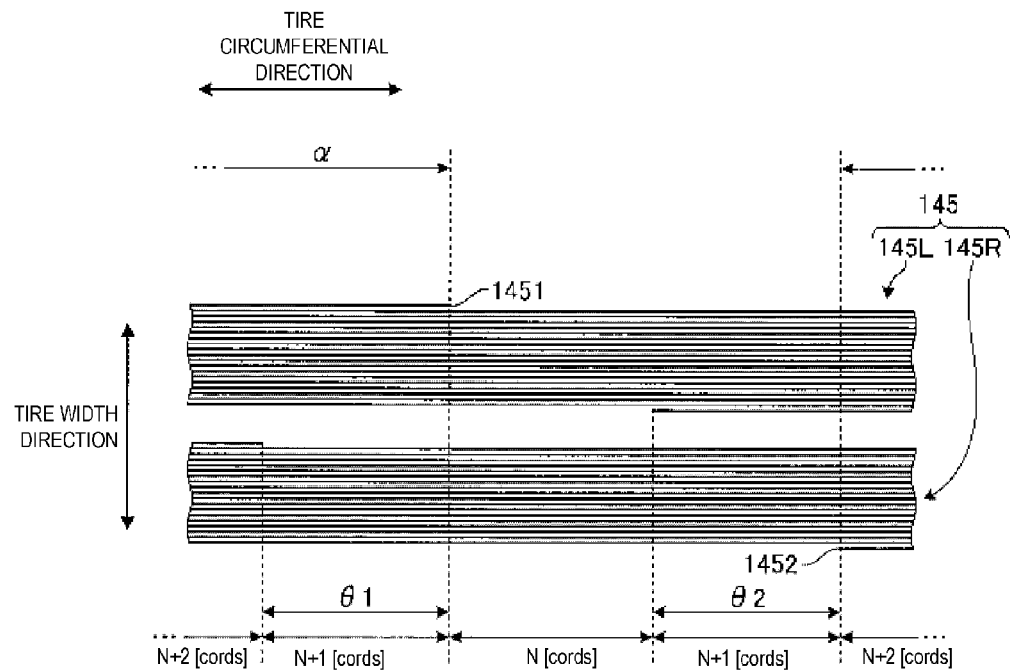
FIG. 16 is an explanatory view illustrating a modified example of the circumferential reinforcing layer depicted in FIG. 5.

For example, in the modified examples in FIGS. 14 to 16, the circumferential reinforcing layer 145 has a structure divided in two in the tire width direction in the center portion. As a result, the circumferential reinforcing layer 145 is configured respectively by left and right divided portions 145L and 145R, and has the end portions of the wires 1451, 1452 in the center portion in the tire width direction. Moreover, one divided portion 145L (145R) has a single structure in which the divided portion 145L (145R) is configured by a single wire 1451 (1452) that is wound spirally around the periphery of the inner-side cross belt 142. As a result, the circumferential reinforcing layer 145 has a total of four wire end portions.

In the circumferential reinforcing layer 145 having a divided structure, the crossing angle α is defined and made appropriate with the end portions of the wires 1451, 1452 at the left and right edges (edges outward in the tire width direction of the left and right divided portions 145L, 145R) of the circumferential reinforcing layer 145 as a reference.

In the modified examples in FIGS. 14 to 16, the positions of the end portions of the wires 1451, 1452 are each adjusted so that the crossing angle α is within a range of 5 deg≤α≤355 deg, since either of the left and right divided portions 145L, 145R are configured by a single wire 1451, 1452. This point is the same as the configurations in FIGS. 5 and 6.

Moreover, when the divided portions 145L, 145R of the circumferential reinforcing layer 145 are configured by X number (where X is a natural number) of cords of the wires 1451, 1452 that are wound spirally, the positions of the end portions of the wires 1451, 1452 are each adjusted so that the difference between the maximum value and the minimum value of the apparent number of wire cords when viewed as a cross-section from a direction perpendicular to the tire circumferential direction is equal to or less than X number of wire cords in any 30 deg zone around the tire rotational axis. In such a configuration, local variation in stiffness in the tire circumferential direction is effectively alleviated since the positions of the end portions of the wires 1451, 1452 of the divided portions 145L, 145R are made appropriate.

For example, in the modified examples of FIGS. 14 and 15, when the end portion of the wire oriented to the left side in the drawings is referred to as the starting edge, and the end portion of the wire oriented to the right side in the drawings is referred to as the terminating edge, the starting edges and the terminating edges of the wires 1451, 1452 are alternately disposed in the tire circumferential direction. Therefore, the apparent number of wire cords of the wire when viewed as a cross-section from a direction perpendicular to the tire circumferential direction becomes N cords or N+1 cords in any position. As a result, the difference between the maximum value and the minimum value of the apparent number of wire cords is configured to become one cord or less in any zone in the tire circumferential direction.

Moreover, in the modified example in FIG. 16, the starting edges (terminating edges) of the wires 1451, 1452 are sequentially disposed in the tire circumferential direction. As a result, the positions of the end portions of the wires 1451, 1452 are each adjusted so that a disposition angle θ1 (θ2) in the tire circumferential direction of adjacent starting edges (terminating edges) satisfies 30 deg<θ1 (30 deg<θ2). As a result, the difference between the maximum value and the minimum value of the apparent number of wire cords is configured to become one cord or less in any zone in the tire circumferential direction. The disposition angle θ1 (θ2) is an angle around the tire rotational axis and indicates a disposition interval in the tire circumferential direction of the starting edges (terminating edges) of the adjacent wires 1451, 1452. Additionally, the upper limit of the disposition angle θ1 (θ2) of the starting edge (terminating edge) is restricted by the position of the terminating edge (starting edge) because the starting edges (terminating edges) of the wires 1451, 1452 are sequentially disposed in the tire circumferential direction.

Figure 17:
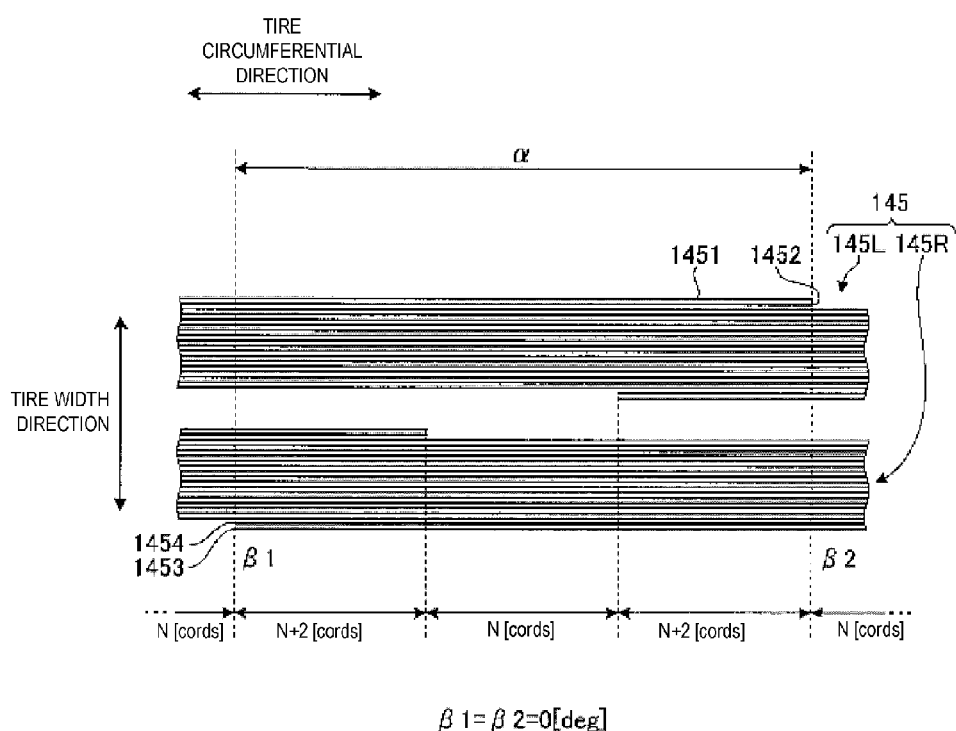
FIG. 17 is an explanatory view illustrating a modified example of the circumferential reinforcing layer depicted in FIG. 5.

Next, the modified example of FIG. 17 differs from the modified examples of FIGS. 14 to 16 in that one divided portion 145L (145R) is configured by two wires 1451, 1452 (1453, 1454) that are wound spirally around side-by-side to each other. The starting edges of the wires 1451, 1452 (1453, 1454) are disposed aligned with each other at a position in the tire circumferential direction, and the terminating edges thereof are disposed aligned with each other at a position in the tire circumferential direction. As a result, the offset angles β1, β2 satisfy β1=β2=0 deg. Moreover, the circumferential reinforcing layer 145 has a total of eight wire end portions.

In the modified example in FIG. 17, the positions of the end portions of the wires 1451 to 1454 are each adjusted so that the crossing angle α is within a range of 10 deg≤α≤350 deg. This point is the same as that of the modified examples in FIGS. 7 and 8.

Moreover, in the modified example of FIG. 17, the positions of the end portions of the wires 1451 to 1454 are each adjusted so that the difference between the maximum value and the minimum value of the apparent number of wire cords when viewed as a cross-section from a direction perpendicular to the tire circumferential direction is equal to or less than two wire cords in any 30 deg zone around the tire rotational axis. Specifically, the starting edges and the terminating edges of one aligned pair of wires 1451, 1452; 1453, 1454 are alternately disposed in the tire circumferential direction. Therefore, the apparent number of wire cords when viewed as a cross-section from a direction perpendicular to the tire circumferential direction satisfies N cords or N+2 cords in any position. As a result, the difference between the maximum value and the minimum value of the apparent number of wire cords is configured to be two cords or less in any zone in the tire circumferential direction.

Figure 18:
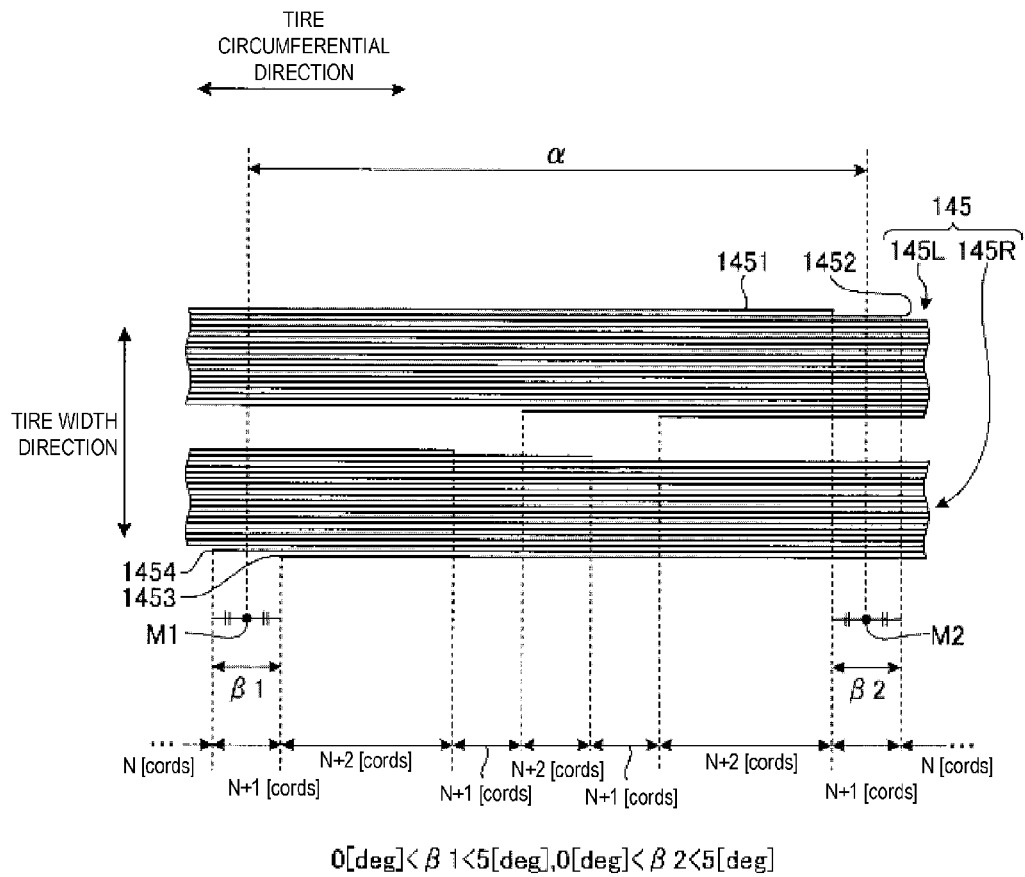
FIG. 18 is an explanatory view illustrating a modified example of the circumferential reinforcing layer depicted in FIG. 5.

Next, the modified example of FIG. 18 differs from the modified example of FIG. 17 in that the starting edges and the terminating edges of the adjacent wires 1451, 1452 (1453, 1454) are disposed with the positions offset in the tire circumferential direction. As a result, the end portions of the adjacent wires 1451, 1452; 1453, 1454 at the left and right edges of the circumferential reinforcing layer 145 each have offset angles β1, β2. Moreover, these offset angles β1, β2 are within a range of 0 deg<β1<5 deg and 0 deg<β2<5 deg, and the end portions of the adjacent wires 1451, 1452; 1453, 1454 are in a state of being substantially disposed aligned with each other.

Consequently, in the modified example in FIG. 18, the positions of the end portions of the wires 1451 to 1454 are each adjusted so that the crossing angle α is within a range of 10 deg≤α≤350 deg. This point is the same as the modified example in FIG. 9.

Moreover, in the modified example of FIG. 18, the offset angles β1, β2 may be within a range of 5 deg≤β1≤180 deg and 5 deg≤β2≤180 deg (not illustrated on the drawings). As such, the crossing angles α1 to α4 are each defined for the combinations of the end portions of the two wires 1451, 1452 at the first edge and the end portions of the two wires 1451, 1452 at the second edge of the circumferential reinforcing layer 145. This point is the same as the modified example in FIG. 12.

Moreover, in the modified example of FIG. 18, the positions of the end portions of the wires 1451 to 1454 are each adjusted so that the difference between the maximum value and the minimum value of the apparent number of wire cords when viewed as a cross-section from a direction perpendicular to the tire circumferential direction is equal to or less than two wire cords in any 30 deg zone around the tire rotational axis. Specifically, the starting edges and the terminating edges of the wires 1451 to 1454 are alternately disposed in the tire circumferential direction. Therefore, the apparent number of wire cords when viewed as a cross-section from a direction perpendicular to the tire circumferential direction becomes N cords, N+1 cords, or N+2 cords in any position. As a result, the difference between the maximum value and the minimum value of the apparent number of wire cords is configured to become two cords or less in any zone in the tire circumferential direction.

Additionally, in the modified examples in FIGS. 17 and 18, the left and right divided portions 145L, 145R of the circumferential reinforcing layer 145 have a two-wire winding structure configured by two wires 1451, 1452; 1453, 1454. However, the configuration is not limited thereto, and the left and right divided portions 145L, 145R of the circumferential reinforcing layer 145 may have a multiple winding structure configured by three or more wires that are wound spirally around side-by-side to each other (not illustrated on the drawings). In such a configuration, the crossing angle α can be made appropriate in the same way as the modified examples in FIGS. 7 to 13, FIG. 17, and FIG. 18. Moreover, similar to the modified example of FIG. 18, the positions of the end portions of the wires are each adjusted so that the difference between the maximum value and the minimum value of the apparent number of wire cords when viewed as a cross-section from a direction perpendicular to the tire circumferential direction is equal to or less than the number of wire cords that configures the divided portions 145L, 145R in any 30 deg zone around the tire rotational axis.

Additionally, in the modified examples in FIGS. 14 to 18, the circumferential reinforcing layer 145 has a divided structure configured by the left and right divided portions 145L, 145R. However, the configuration is not limited thereto, and the circumferential reinforcing layer 145 may have a multiple divided structure configured by three or more portions (not illustrated on the drawings). Furthermore, the divided portions may be configured by mutually different numbers of wires. In this case, the crossing angle α is defined and made appropriate with the end portions of the wires at the left and right edges (the left and right edges on the outermost side in the tire width direction) of the circumferential reinforcing layer 145 as a reference. Moreover, the difference between the maximum value and the minimum value of the apparent number of wire cords when viewed as a cross-section from a direction perpendicular to the tire circumferential direction is made appropriate using the maximum value of the number of wire cords in the left and right divided portions on the outermost side in the tire width direction as a reference.

Additional Data

In the pneumatic tire 1, the circumferential reinforcing layer 145 is disposed inward in the tire width direction of the left and right edges of the narrower cross belt 143 of the pair of cross belts 142, 143 (see FIG. 3). Additionally, the width W of the narrower cross belt 143 and the distance S from an edge of the circumferential reinforcing layer 145 to an edge of the narrower cross belt 143 is in the range of 0.03≤S/W.

For example, in this embodiment, the outer-side cross belt 143 has a narrow structure and the circumferential reinforcing layer 145 is disposed inward in the tire width direction from the left and right edges of the outer-side cross belt 143. Additionally, the outer-side cross belt 143 and the circumferential reinforcing layer 145 are disposed so as to be left-right symmetric centered on the tire equatorial plane CL. Moreover, the positional relationship S/W between the edges of the outer-side cross belt 143 and the edges of the circumferential reinforcing layer 145 is made appropriate so as to fall within the above range in a first region demarcated by the tire equatorial plane CL.

In such a configuration, the positional relationship S/W between the edges of the cross belts 142, 143 and the edges of the circumferential reinforcing layer 145 is made appropriate. As a result, strain occurring in the rubber materials near the circumferential reinforcing layer 145 can be reduced.

The width W and the distance S are measured as distances in the tire width direction when viewed as a cross-section from the tire meridian direction. Moreover, the upper limit of S/W, although not limited in particular, is restricted by the relationship between the width Ws of the circumferential reinforcing layer 145 and the width W of the narrow cross belt 143.

Moreover, the width Ws of the circumferential reinforcing layer 145 is generally set to satisfy 60≤Ws/W. The width Ws of the circumferential reinforcing layer 145 is the sum of the widths of the divided portions 145L, 145R when the circumferential reinforcing layer 145 has a divided structure (see FIG. 14).

Moreover, in the pneumatic tire 1, the wire 1451 that configures the circumferential reinforcing layer 145 is preferably steel wire, and the number of ends of the circumferential reinforcing layer 145 preferably is no less than 17 ends/50 mm and no more than 30 ends/50 mm. Moreover, the wire diameter is preferably within a range of no less than 1.2 mm and no more than 2.2 mm. The wire diameter is measured as the diameter of a circumscribed circle of the wire in a configuration in which the wire is configured by a plurality of twisted wire cords.

Effect

As described above, the pneumatic tire 1 includes the belt layer 14 having the pair of cross belts 142, 143, and the circumferential reinforcing layer 145 disposed between the cross belts 142, 143 or disposed inward in the tire radial direction of the cross belts 142, 143 (see FIGS. 1 and 2). Moreover, the circumferential reinforcing layer 145 is configured by one wire 1451 that is wound spirally at a slant within a range of ±5 deg with respect to the tire circumferential direction (see FIG. 4). Moreover, the crossing angle α in the tire circumferential direction of the wire end portion at the first edge and the wire end portion at the second edge of the circumferential reinforcing layer 145 is within the range of 5 deg≤α≤355 deg (see FIGS. 5 and 6).

In such a configuration, local variation in stiffness in the tire circumferential direction is suppressed since the crossing angle α of the end portions of the wire 1451 in the circumferential reinforcing layer 145 is made appropriate (see FIGS. 5 and 6). As a result, the occurrence of separation between rubber materials near the circumferential reinforcing layer is suppressed and tire durability is improved.

Moreover, in the pneumatic tire 1, the circumferential reinforcing layer 145 is configured by a plurality of wires that are wound spirally around side-by-side to each other at a slant within a range of ±5 deg with respect to the tire circumferential direction (see FIGS. 7 to 11). At least one of an offset angle β1 in the tire circumferential direction of the end portions of the plurality of wires at the first edge and an offset angle β2 in the tire circumferential direction of the end portions of the plurality of wires at the second edge of the circumferential reinforcing layer 145 is within the range of no less than 0 deg and less than 5 deg. Moreover, the crossing angles α (α1, α2) in the tire circumferential direction of the end portions of the wires 1451, 1452 at the first edge and the end portions of the wires 1451, 1452 at the second edge of the circumferential reinforcing layer 145 is within the range of 10 deg≤α≤350 deg.

In such a configuration, local variation in stiffness in the tire circumferential direction is suppressed since the crossing angles α (α1, α2) of the end portions of the wires 1451, 1452 in the circumferential reinforcing layer 145 are made appropriate (for example, see FIGS. 7 and 8). As a result, the occurrence of separation between rubber materials near the circumferential reinforcing layer is suppressed and tire durability is improved.

Moreover, in the pneumatic tire 1, the circumferential reinforcing layer 145 is configured by a plurality of wires that are wound spirally around side-by-side to each other at a slant within a range of ±5 deg with respect to the tire circumferential direction (see FIG. 12). Moreover, the offset angle β1 in the tire circumferential direction of the end portions of the plurality of wires at the first edge and the offset angle β2 in the tire circumferential direction of the end portions of the plurality of wires at the second edge of the circumferential reinforcing layer 145 are within the range of 5 deg≤β1≤180 deg and 5 deg≤β2≤180 deg. Moreover, the crossing angles α (α1 to α4) in the tire circumferential direction of the end portions of the wires 1451, 1452 at the first edge and the end portions of the wires 1451, 1452 at the second edge of the circumferential reinforcing layer 145 are within the range of 5 deg≤α≤355 deg.

In such a configuration, local variation in stiffness in the tire circumferential direction is suppressed since the crossing angles α (α1 to α4) of the end portions of the wires 1451, 1452 in the circumferential reinforcing layer 145 are made appropriate. As a result, there is an advantage that the occurrence of separation between rubber materials near the circumferential reinforcing layer 145 is suppressed and tire durability is improved.

Moreover, in the pneumatic tire 1, the circumferential reinforcing layer 145 has a divided structure in which the circumferential reinforcing layer 145 is divided into a plurality of portions in the tire width direction (see FIGS. 14 to 16). Moreover, the divided portions 145L, 145R of the circumferential reinforcing layer 145 are configured by one wire that is wound spirally at a slant within a range of ±5 deg with respect to the tire circumferential direction. Moreover, the crossing angle α in the tire circumferential direction of the wire end portion at the first edge (first edge outward in the tire width direction of the divided portion 145L) and the wire end portion at the second edge (second edge outward in the tire width direction of the divided portion 145R) of the circumferential reinforcing layer 145 is within the range of 5 deg≤α≤355 deg. Moreover, the difference between the maximum value and the minimum value of the apparent number of wire cords when viewed as a cross-section from a direction perpendicular to the tire circumferential direction is equal to or less than one cord in any 30 deg zone around the tire rotational axis. In such a configuration, local variation in stiffness in the tire circumferential direction is effectively alleviated since the positions of the end portions of the wires of the divided portions 145L, 145R are made appropriate.

Moreover, in the pneumatic tire 1, the circumferential reinforcing layer 145 has a divided structure in which the circumferential reinforcing layer 145 is divided into a plurality of portions in the tire width direction (see FIGS. 17 and 18). Moreover, the divided portions 145L, 145R of the circumferential reinforcing layer 145 are configured by a plurality of wires that are wound spirally at a slant within a range of ±5 deg with respect to the tire circumferential direction. At least one of an offset angle β1 in the tire circumferential direction of the end portions of the plurality of wires at the first edge and an offset angle β2 in the tire circumferential direction of the end portions of the plurality of wires at the second edge of the circumferential reinforcing layer 145 is within the range of no less than 0 deg and less than 5 deg. Moreover, the crossing angle α in the tire circumferential direction of the wire end portion at the first edge and the wire end portion at the second edge of the circumferential reinforcing layer 145 is within the range of 10 deg≤α≤350 deg. Moreover, the difference between the maximum value and the minimum value of the apparent number of wire cords when viewed as a cross-section from a direction perpendicular to the tire circumferential direction is equal to or less than the number of wire cords that configure the divided portions 145L, 145R in any 30 deg zone around the tire rotational axis. In such a configuration, local variation in stiffness in the tire circumferential direction is effectively alleviated since the positions of the end portions of the wires of the divided portions 145L, 145R are made appropriate.

Moreover, in the pneumatic tire 1, the circumferential reinforcing layer 145 has a divided structure in which the circumferential reinforcing layer 145 is divided into a plurality of portions in the tire width direction (not illustrated on the drawings). Moreover, the divided portions 145L, 145R of the circumferential reinforcing layer 145 are configured by a plurality of wires that are wound spirally at a slant within a range of ±5 deg with respect to the tire circumferential direction. Moreover, the offset angle β1 in the tire circumferential direction of the end portions of the plurality of wires at the first edge and the offset angle β2 in the tire circumferential direction of the end portions of the plurality of wires at the second edge of the circumferential reinforcing layer 145 are within the range of 5 deg≤β1≤180 deg and 5 deg≤β2≤180 deg. Moreover, the crossing angle α in the tire circumferential direction of the wire end portion at the first edge and the wire end portion at the second edge of the circumferential reinforcing layer 145 is within the range of 5 deg≤α≤355 deg. Moreover, the difference between the maximum value and the minimum value of the apparent number of wire cords when viewed as a cross-section from a direction perpendicular to the tire circumferential direction is equal to or less than the number of wire cords that configure the divided portions 145L, 145R in any 30 deg zone around the tire rotational axis. In such a configuration, local variation in stiffness in the tire circumferential direction is effectively alleviated since the positions of the end portions of the wires of the divided portions 145L, 145R are made appropriate.

In the pneumatic tire 1, the circumferential reinforcing layer 145 is disposed inward in the tire width direction of the left and right edges of the narrower cross belt 143 of the pair of cross belts 142, 143 (see FIG. 3). Additionally, the width W of the narrower cross belt 143 and the distance S from an edge of the circumferential reinforcing layer 145 to an edge of the narrower cross belt 143 is in the range of 0.03≤S/W. In such a configuration, there is an advantage in that the positional relationship S/W between the edges of the cross belts 142, 143 and the edges of the circumferential reinforcing layer 145 is made appropriate to reduce strain occurring in the rubber materials near the circumferential reinforcing layer 145.

Moreover, in the pneumatic tire 1, the wire that configures the circumferential reinforcing layer 145 is steel wire, and the number of ends of the circumferential reinforcing layer 145 is no less than 17 ends/50 mm and no more than 30 ends/50 mm. As a result, the structural strength of the circumferential reinforcing layer 145 can be appropriately ensured.

Moreover, in the pneumatic tire 1, the diameter of the wire that configures the circumferential reinforcing layer 145 is within a range of no less than 1.2 mm and no more than 2.2 mm. As a result, the structural strength of the circumferential reinforcing layer 145 can be appropriately ensured.

Moreover, the pneumatic tire 1 preferably has the nominal aspect ratio S within a range of S≤70. Furthermore, the pneumatic tire 1 is preferably used as a heavy duty pneumatic tire for buses and trucks as in this embodiment. A pneumatic tire with a nominal aspect ratio S of S≤70, and in particular a heavy duty pneumatic tire for buses and trucks can demonstrate more improved performances such as durability by including the circumferential reinforcing layer, and furthermore, can demonstrate more improved tire durability by regulating the positions of the end portions of the circumferential reinforcing layer as in this embodiment.

EXAMPLES

FIGS. 19*a*-19*d* include a table showing the results of performance testing of pneumatic tires according to embodiments of the present invention.

In these performance tests, evaluations was carried out on several different tires for (1) durability and (2) weight balance (see FIGS. 19*a*-19*d*). Additionally, pneumatic tires having a tire size of 445/50R22.5 were assembled on a "design rim" as prescribed by TRA, and the maximum value of the air pressure in "Tire Load Limits at Various Cold Inflation Pressures" as prescribed by TRA, and the maximum value of "Tire Load Limits at Various Cold Inflation Pressures" were applied.

(1) An indoor drum testing machine was used in the evaluation of durability to measure the distance traveled until the tire was broke down, applying 80% of the air pressure as prescribed by TRA. Evaluations were performed by indexing the measurement results with the Conventional Example as the standard score (100). In the evaluations, higher scores were preferable, and a numerical value of 105 or greater demonstrates superiority.

(2) The weight balance in the tire circumferential direction was measured under static conditions for the evaluations for weight balance. Evaluations were performed by indexing the measurement results with the Conventional Example as the standard score (100). In the evaluations, higher scores were preferable, and a numerical value of 98 or greater demonstrates that the weight balance is appropriately ensured.

The pneumatic tires 1 of the Working Examples 1 to 4 and 21 have the configuration of FIG. 5 or 6, and the circumferential reinforcing layer 145 has a single structure in which the circumferential reinforcing layer 145 is configured by one wire 1451 that is wound spirally. The pneumatic tires 1 of the Working Examples 5 to 16 have the configuration of FIGS. 7 to 9, and the circumferential reinforcing layer 145 has a single structure configured by two wires 1451, 1452 that are wound spirally. The Working Examples 17 to 20 have the configuration of FIG. 14 or FIG. 15, the circumferential reinforcing layer 145 has a divided structure in which the circumferential reinforcing layer 145 is configured by left and right divided portions 145L, 145R, and these divided portions 145L, 145R have a single structure in which the divided portions 145L, 145R are configured by one wire that is wound spirally.

In the configuration of FIG. 1, the pneumatic tire of the Conventional Example does not have the circumferential reinforcing layer.

As is clear from the test results, the pneumatic tires of the Working Examples 1 to 21 demonstrate improved tire durability. Moreover, it can be seen that the tire weight balance is improved due to the crossing angle α being made appropriate.

What is claimed is:

1. A pneumatic tire comprising a belt layer having a pair of cross belts and a circumferential reinforcing layer disposed between the cross belts or disposed inward in a tire radial direction of the cross belts; wherein, the circumferential reinforcing layer has a multiple winding structure configured by a plurality of wires that are wound spirally around side-by-side to each other at a slant within a range of ±5 deg with respect to a tire circumferential direction;

an offset angle $\beta 1$ in the tire circumferential direction of end portions of the plurality of wires at a first edge and an offset angle $\beta 2$ in the tire circumferential direction of end portions of the plurality of wires at a second edge of the circumferential reinforcing layer is within a range 0 deg<$\beta 1$<5 deg and 5 deg≤$\beta 2$≤180 deg;

a crossing angle α in the tire circumferential direction of an end portion of the wire at the first edge and an end portion of the at the second edge of the circumferential reinforcing layer is within a range of 10 deg≤α≤350 deg;

the circumferential reinforcing layer is disposed inward in the tire width direction of the left and right edges of a narrower cross belt of the pair of cross belts, and a width W of the narrower cross belt and a distance S from an edge of the circumferential reinforcing layer to an edge of the narrower cross belt are in ranges such that 0.03≤S/W; and the circumferential reinforcing layer continuously extending from a first side of a tire equatorial plane to a second side of the tire equatorial plane in the tire width direction.

2. The pneumatic tire according to claim 1, wherein the wire is a steel wire, and the number of ends of the circumferential reinforcing layer is no less than 17 ends/50 mm and no more than 30 ends/50 mm.

3. The pneumatic tire according to claim 1, wherein a diameter of the wire is within a range of no less than 1.2 mm and no more than 2.2 mm.

4. The pneumatic tire according to claim 1, wherein a width Ws of the circumferential reinforcing layer and the width W of the narrower cross belt have a relationship such that 60%≤Ws/W.

5. The pneumatic tire according to claim 1, wherein the crossing angle α is within a range of 20 deg≤α≤40 deg.

6. The pneumatic tire according to claim 1, wherein the crossing angle α is within a range of 10 deg≤α≤30 deg or 330 deg≤α≤350 deg.

7. A pneumatic tire comprising a belt layer having a pair of cross belts and a circumferential reinforcing layer disposed between the cross belts or disposed inward in a tire radial direction of the cross belts; wherein, the circumferential reinforcing layer has a multiple winding structure composed of a plurality of wires that are wound spirally around side-by-side to each other at a slant within a range of ±5 deg with respect to a tire circumferential direction, each of the plurality of wires of the multiple winding structure continuously extending over an entire width of the circumferential reinforcing layer respectively;

an offset angle $\beta 1$ in the tire circumferential direction of end portions of the plurality of wires at a first edge and an offset angle $\beta 2$ in the tire circumferential direction of end portions of the plurality of wires at a second edge of the circumferential reinforcing layer are within a range of 5 deg≤β1≤180 deg and 5 deg≤β2≤180 deg;

a crossing angle α in the tire circumferential direction of an end portion of the wire at the first edge and an end portion of the wire at the second edge of the circumferential reinforcing layer is within a range of 5 deg≤α≤355 deg;

the circumferential reinforcing layer is disposed inward in the tire width direction of the left and right edges of a narrower cross belt of the pair of cross belts, and a width W of the narrower cross belt and a distance S from an edge of the circumferential reinforcing layer to an edge of the narrower cross belt are in ranges such that 0.03≤S/W; and the circumferential reinforcing layer continuously extending from a first side of a tire equatorial plane to a second side of the tire equatorial plane in the tire width direction.

8. The pneumatic tire according to claim 7, wherein the wire is a steel wire, and the number of ends of the circumferential reinforcing layer is no less than 17 ends/50 mm and no more than 30 ends/50 mm.

9. The pneumatic tire according to claim 7, wherein a diameter of the wire is within a range of no less than 1.2 mm and no more than 2.2 mm.

10. The pneumatic tire according to claim 7, wherein a width Ws of the circumferential reinforcing layer and the width W of the narrower cross belt have a relationship such that 60%≤Ws/W.

11. The pneumatic tire according to claim 7, wherein the crossing angle α is within a range of 20 deg≤α≤40 deg.

12. The pneumatic tire according to claim 7, wherein the crossing angle α is within a range of 10 deg≤α≤30 deg or 330 deg≤α≤350 deg.

13. A pneumatic tire comprising a belt layer having a pair of cross belts and a circumferential reinforcing layer disposed between the cross belts or inward in a tire radial direction of the cross belts; wherein, the circumferential reinforcing layer has a divided structure in which the circumferential reinforcing layer is divided into a plurality of portions in a tire width direction, and each of divided portions of the circumferential reinforcing layer has a single winding structure configured by one wire that is wound spirally at a slant within a range of ±5 deg with respect to a tire circumferential direction;

a crossing angle α in the tire circumferential direction of an end portion of the wire at a first edge and an end portion of the wire at a second edge of the circumferential reinforcing layer is within a range of 5 deg≤α≤355 deg;

a difference between a maximum value and a minimum value of the apparent number of wire cords when viewed as a cross-section from a direction perpendicular to the tire circumferential direction is equal to or less than one cord in any 30 deg zone around a tire rotational axis; and the circumferential reinforcing layer is disposed inward in the tire width direction of the left and right edges of a narrower cross belt of the pair of cross belts, and a width W of the narrower cross belt and a distance S from an edge of the circumferential reinforcing layer to an edge of the narrower cross belt are in ranges such that 0.03≤S/W.

14. The pneumatic tire according to claim 13, wherein a width Ws of the circumferential reinforcing layer and the width W of the narrower cross belt have a relationship such that 60%≤Ws/W.

15. The pneumatic tire according to claim 13, wherein the crossing angle α is within a range of 20 deg≤α≤40 deg.

16. The pneumatic tire according to claim 13, wherein the crossing angle α is within a range of 5 deg≤α≤30 deg or 330 deg≤α≤355 deg.

17. A pneumatic tire comprising a belt layer having a pair of cross belts and a circumferential reinforcing layer disposed between the cross belts or disposed inward in the tire radial direction of the cross belts; wherein, the circumferential reinforcing layer has a divided structure in which the circumferential reinforcing layer is divided into a plurality of portions in a tire width direction, and each of divided portions of the circumferential reinforcing layer has a multiple winding structure configured by a plurality of wires that are wound spirally around side-by-side to each other at a slant within a range of ±5 deg with respect to a tire circumferential direction;

at least one of an offset angle β1 in the tire circumferential direction of end portions of the plurality of wires at a first edge and an offset angle β2 in the tire circumferential direction of end portions of the plurality of wires at a second edge of the circumferential reinforcing layer is within a range of no less than 0 deg and less than 5 deg;

a crossing angle α in the tire circumferential direction of an end portion of the wire at the first edge and an end portion of the wire at the second edge of the circumferential reinforcing layer is within a range of 10 deg≤α≤350 deg;

a difference between a maximum value and a minimum value of the apparent number of wire cords when viewed as a cross-section from a direction perpendicular to the tire circumferential direction is equal to or less than the number of wire cords that configure one of the divided portions in any 30 deg zone around a tire rotational axis; and the circumferential reinforcing layer is disposed inward in the tire width direction of the left and right edges of a narrower cross belt of the pair of cross belts, and a width W of the narrower cross belt and a distance S from an edge of the circumferential reinforcing layer to an edge of the narrower cross belt are in ranges such that 0.03≤S/W.

18. The pneumatic tire according to claim 17, wherein a width Ws of the circumferential reinforcing layer and the width W of the narrower cross belt have a relationship such that 60%≤Ws/W.

19. The pneumatic tire according to claim 17, wherein the circumferential reinforcing layer has a divided structure in which the circumferential reinforcing layer is divided into a plurality of portions in a tire width direction, and divided portions of the circumferential reinforcing layer respectively have the multiple winding structure configured by a plurality of wires that are wound spirally around side-by-side to each other at a slant within a range of ±5 deg with respect to a tire circumferential direction.

20. The pneumatic tire according to claim 17, wherein the crossing angle α is within a range of 20 deg≤α≤40 deg.

21. The pneumatic tire according to claim 17, wherein the crossing angle α is within a range of 10 deg≤α≤30 deg or 330 deg≤α≤350 deg.

22. A pneumatic tire comprising a belt layer having a pair of cross belts and a circumferential reinforcing layer disposed between the cross belts or disposed inward in the tire radial direction of the cross belts; wherein, the circumferential reinforcing layer has a divided structure in which the circumferential reinforcing layer is divided into a plurality of portions in the tire width direction, and each of divided portions of the circumferential reinforcing layer has a multiple winding structure configured by a plurality of wires that are wound spirally around side-by-side to each other at a slant within a range of ±5 deg with respect to a tire circumferential direction;

an offset angle $\beta1$ in the tire circumferential direction of end portions of the plurality of wires at a first edge and an offset angle $\beta2$ in the tire circumferential direction of end portions of the plurality of wires at a second edge of the circumferential reinforcing layer are within a range of 5 deg$\leq\beta1\leq$180 deg and 5 deg$\leq\beta2\leq$180 deg;

a crossing angle $\alpha$ in the tire circumferential direction of an end portion of the wire at the first edge and an end portion of the wire at the second edge of the circumferential reinforcing layer is within a range of 5 deg$\leq\alpha\leq$355 deg;

a difference between a maximum value and a minimum value of the apparent number of wire cords when viewed as a cross-section from a direction perpendicular to the tire circumferential direction is equal to or less than the number of wire cords that configure one of the divided portions in any 30 deg zone around the tire rotational axis; and the circumferential reinforcing layer is disposed inward in the tire width direction of the left and right edges of a narrower cross belt of the pair of cross belts, and a width W of the narrower cross belt and a distance S from an edge of the circumferential reinforcing layer to an edge of the narrower cross belt are in ranges such that 0.03$\leq$S/W.

23. The pneumatic tire according to claim 22, wherein a width Ws of the circumferential reinforcing layer and the width W of the narrower cross belt have a relationship such that 60%$\leq$Ws/W.

24. The pneumatic tire according to claim 22, wherein the circumferential reinforcing layer has a divided structure in which the circumferential reinforcing layer is divided into a plurality of portions in a tire width direction, and divided portions of the circumferential reinforcing layer respectively have the multiple winding structure configured by a plurality of wires that are wound spirally around side-by-side to each other at a slant within a range of ±5 deg with respect to a tire circumferential direction.

25. The pneumatic tire according to claim 22, wherein the crossing angle $\alpha$ is within a range of 20 deg$\leq\alpha\leq$40 deg.

26. The pneumatic tire according to claim 22, wherein the crossing angle $\alpha$ is within a range of 10 deg$\leq\alpha\leq$30 deg or 330 deg$\leq\alpha\leq$350 deg.

27. A pneumatic tire comprising a belt layer having a pair of cross belts and a circumferential reinforcing layer disposed between the cross belts or disposed inward in a tire radial direction of the cross belts; wherein, the circumferential reinforcing layer has a single winding structure configured by a plurality of wires that are wound spirally around side-by-side to each other at a slant within a range of ±5 deg with respect to a tire circumferential direction;

at least one of an offset angle $\beta1$ in the tire circumferential direction of end portions of the plurality of wires at a first edge and an offset angle $\beta2$ in the tire circumferential direction of end portions of the plurality of wires at a second edge of the circumferential reinforcing layer is within a range of no less than 0 deg and less than 5 deg;

a crossing angle $\alpha$ in the tire circumferential direction of an end portion of the wire at the first edge and an end portion of the at the second edge of the circumferential reinforcing layer is within a range of 10 deg$\leq\alpha\leq$350 deg;

the circumferential reinforcing layer is disposed inward in the tire width direction of the left and right edges of a narrower cross belt of the pair of cross belts, and a width W of the narrower cross belt and a distance S from an edge of the circumferential reinforcing layer to an edge of the narrower cross belt are in ranges such that 0.03$\leq$S/W; and the offset angle $\beta1$ is within a range of 0 deg$<\beta1<$5 deg and the offset angle $\beta2$ is within a range of 0 deg$<\beta2<$5 deg.

* * * * *